(12) United States Patent
Teal et al.

(10) Patent No.: US 10,695,607 B2
(45) Date of Patent: Jun. 30, 2020

(54) DRIVE MECHANISM WITH FOOT PLATFORM ANGLE ADJUSTMENT MECHANISM FOR ELLIPTICALLY-DRIVEN DEVICE

(71) Applicant: PT Motion Works, Inc., Solana Beach, CA (US)

(72) Inventors: Brent C. Teal, Solana Beach, CA (US); Brian Lee Hill, San Diego, CA (US)

(73) Assignee: PT Motion Works, Inc., Solana Beach, CA (US)

( * ) Notice: Subject to any disclaimer, the term of this patent is extended or adjusted under 35 U.S.C. 154(b) by 108 days.

(21) Appl. No.: 15/675,040

(22) Filed: Aug. 11, 2017

(65) Prior Publication Data

US 2018/0050231 A1   Feb. 22, 2018

Related U.S. Application Data

(60) Provisional application No. 62/375,990, filed on Aug. 17, 2016.

(51) Int. Cl.
*A63B 22/06* (2006.01)
*A63B 22/00* (2006.01)
(Continued)

(52) U.S. Cl.
CPC ........ *A63B 22/0664* (2013.01); *A63B 21/227* (2013.01); *A63B 22/0015* (2013.01); *A63B 22/0017* (2015.10); *A63B 22/0046* (2013.01); *B62K 3/002* (2013.01); *B62M 1/26* (2013.01); *A63B 22/001* (2013.01);
(Continued)

(58) Field of Classification Search
CPC ............ A63B 22/0664; A63B 22/0015; A63B 22/0046; A63B 22/0017; A63B 21/227; A63B 22/208; A63B 2022/067; A63B 22/0061; A63B 22/001; A63B 2022/0682; B62M 1/26; B62K 3/002; B63H 16/20
See application file for complete search history.

(56) References Cited

U.S. PATENT DOCUMENTS 5,088,944 A * 2/1992 Kats ...................... B63B 35/795
                                                            440/26
5,308,268 A * 5/1994 Schmid .................. B63H 16/14
                                                            114/362
(Continued)

FOREIGN PATENT DOCUMENTS

EP         2647561 A1    10/2013

OTHER PUBLICATIONS

International Search Report and Written Opinion for International application No. PCT/US2016/065000 dated Mar. 7, 2017.

*Primary Examiner* — Garrett K Atkinson
(74) *Attorney, Agent, or Firm* — Procopio Cory Hargreaves and Savitch LLP

(57) ABSTRACT

A drive mechanism for an elliptically-driven device includes a drive arm with a foot platform pivot assembly; a crank arm; a foot platform assembly pivotally coupled to the drive arm via the foot platform pivot assembly; a foot platform angle adjustment mechanism operably coupling the foot platform assembly to the crank arm so as to impart a foot platform angle of the foot platform assembly relative to the drive arm that varies during a stroke of the foot platform assembly.

24 Claims, 23 Drawing Sheets

(51) Int. Cl.
*A63B 21/22* (2006.01)
*B62M 1/26* (2013.01)
*B62K 3/00* (2006.01)
*B63H 16/20* (2006.01)
*A63B 22/20* (2006.01)

(52) U.S. Cl.
CPC ......... *A63B 22/0061* (2013.01); *A63B 22/208* (2013.01); *A63B 2022/067* (2013.01); *A63B 2022/0682* (2013.01); *B63H 16/20* (2013.01)

(56) References Cited

U.S. PATENT DOCUMENTS

| | | | | |
|---|---|---|---|---|
| 5,743,832 A * | 4/1998 | Sands | A63B 22/001 | 482/112 |
| 5,788,610 A * | 8/1998 | Eschenbach | A63B 22/001 | 482/51 |
| 5,836,855 A * | 11/1998 | Eschenbach | A63B 22/001 | 482/57 |
| 6,024,676 A * | 2/2000 | Eschenbach | A63B 22/001 | 482/51 |
| 6,142,915 A * | 11/2000 | Eschenbach | A63B 22/001 | 482/52 |
| 6,312,365 B1 * | 11/2001 | Koenig | A63B 21/0615 | 482/93 |
| 6,672,992 B1 * | 1/2004 | Lo | A63B 22/0015 | 482/52 |
| 6,719,666 B1 * | 4/2004 | Lo | A63B 22/0015 | 482/52 |
| 6,802,797 B2 * | 10/2004 | Maresh | A63B 22/0007 | 482/52 |
| 6,994,657 B1 * | 2/2006 | Eschenbach | A63B 22/001 | 482/51 |
| 7,175,568 B2 * | 2/2007 | Eschenbach | A63B 22/001 | 482/52 |
| 7,270,626 B2 * | 9/2007 | Porth | A63B 22/001 | 482/52 |
| 7,278,955 B2 * | 10/2007 | Giannelli | A63B 22/0056 | 482/51 |
| 7,462,134 B2 * | 12/2008 | Lull | A63B 22/0015 | 482/52 |
| 7,494,447 B2 * | 2/2009 | Eschenbach | A63B 21/154 | 482/52 |
| 7,507,185 B2 * | 3/2009 | Eschenbach | A63B 22/001 | 482/52 |
| 7,520,839 B2 * | 4/2009 | Rodgers, Jr. | A63B 22/001 | 482/51 |
| 7,758,473 B2 * | 7/2010 | Lull | A63B 22/0015 | 482/51 |
| 7,785,235 B2 * | 8/2010 | Lull | A63B 22/001 | 482/52 |
| 7,841,968 B1 * | 11/2010 | Eschenbach | A63B 21/225 | 482/52 |
| 7,976,435 B2 * | 7/2011 | Van Handel | A63B 22/001 | 482/51 |
| 8,029,416 B2 * | 10/2011 | Eschenbach | A63B 22/0017 | 482/52 |
| 8,376,913 B2 * | 2/2013 | Lee | A63B 22/001 | 482/52 |
| 8,408,954 B2 * | 4/2013 | Sturm | B63B 7/085 | 440/21 |
| 8,894,549 B2 * | 11/2014 | Colledge | A63B 22/0046 | 482/4 |
| 2003/0236152 A1 * | 12/2003 | Lo | A63B 22/0015 | 482/52 |
| 2005/0248117 A1 * | 11/2005 | Hung | B62K 3/002 | 280/221 |
| 2005/0277519 A1 * | 12/2005 | Moon | A63B 22/001 | 482/52 |
| 2007/0232457 A1 * | 10/2007 | Porth | A63B 22/001 | 482/51 |
| 2007/0235974 A1 * | 10/2007 | Vargas | B62K 3/002 | 280/256 |
| 2007/0238580 A1 * | 10/2007 | Wang | A63B 22/001 | 482/52 |
| 2010/0179034 A1 * | 7/2010 | Wang | A63B 22/001 | 482/110 |
| 2012/0322624 A1 * | 12/2012 | Wu | A63B 22/203 | 482/52 |
| 2013/0035212 A1 * | 2/2013 | Chuang | A63B 21/015 | 482/52 |
| 2013/0143720 A1 * | 6/2013 | Chuang | A63B 22/0664 | 482/52 |
| 2013/0196826 A1 * | 8/2013 | Colledge | A63B 22/0046 | 482/52 |

* cited by examiner

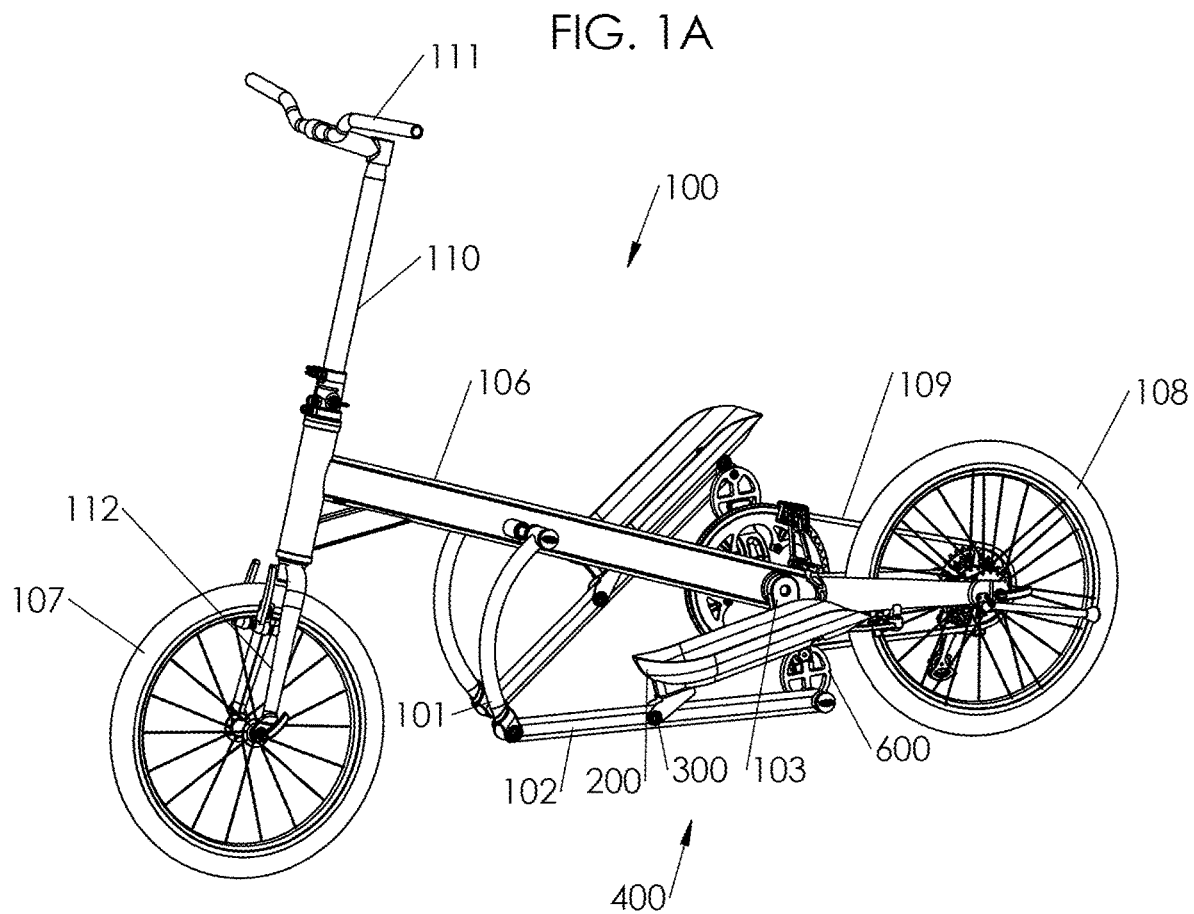

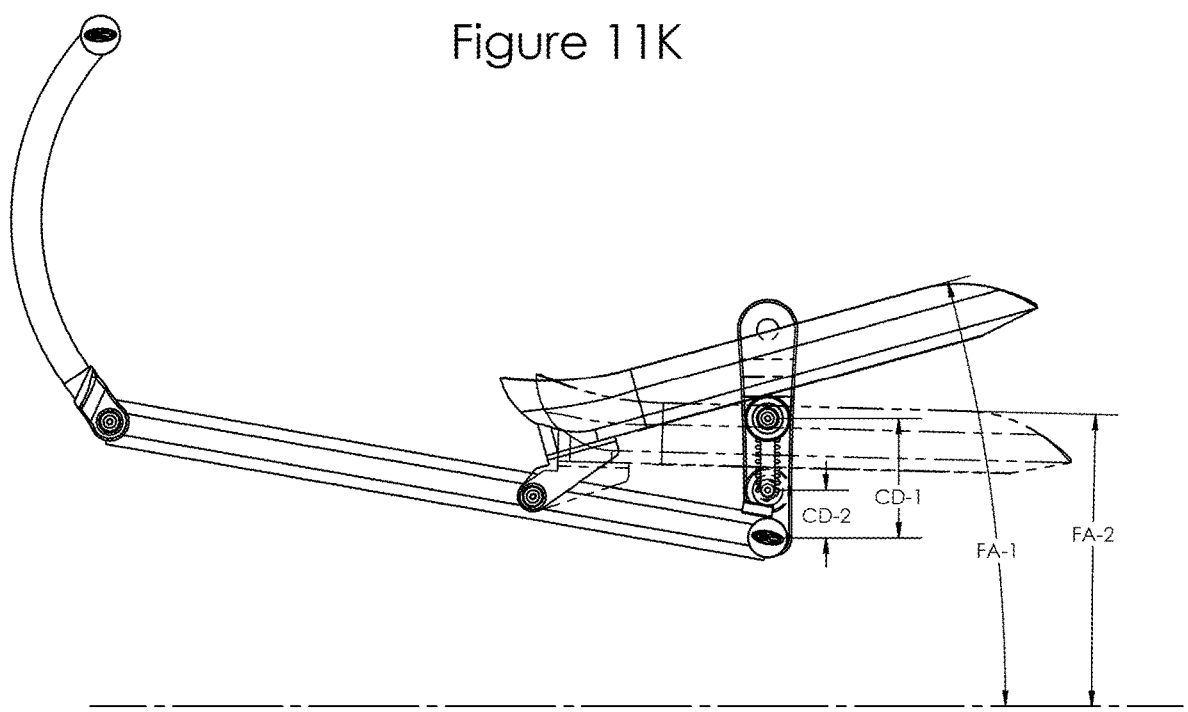

Figure 12B
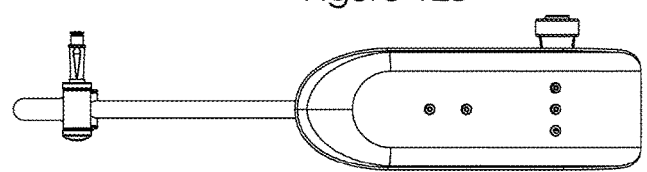
Figure 12E
Figure 12A
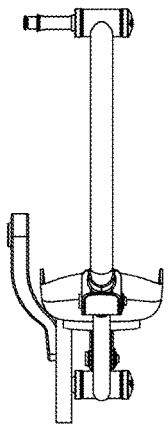
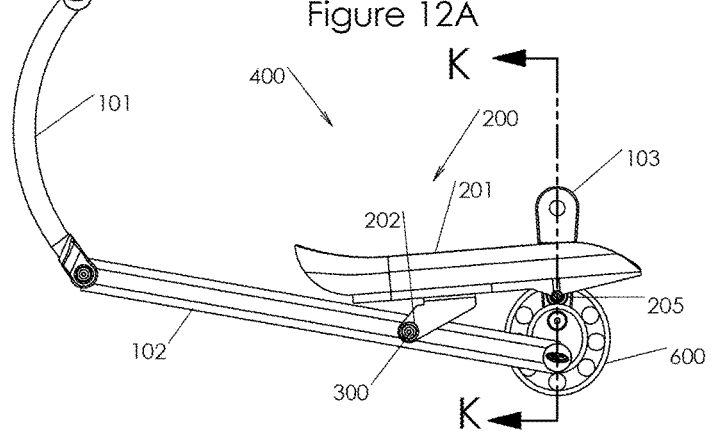
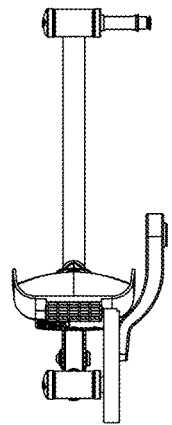
Figure 12C
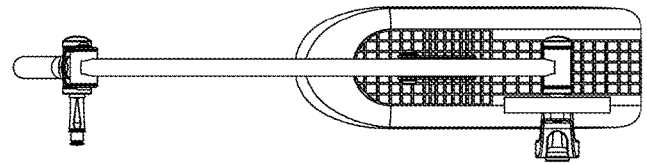
Figure 12D

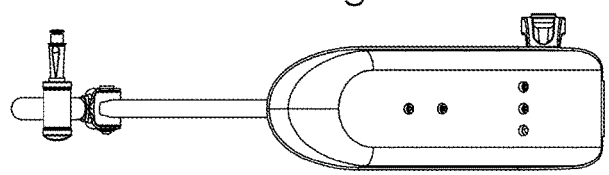
Figure 12G
Figure 12J
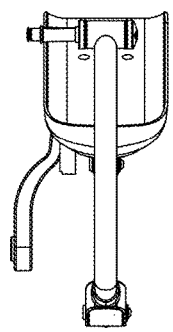
Figure 12F
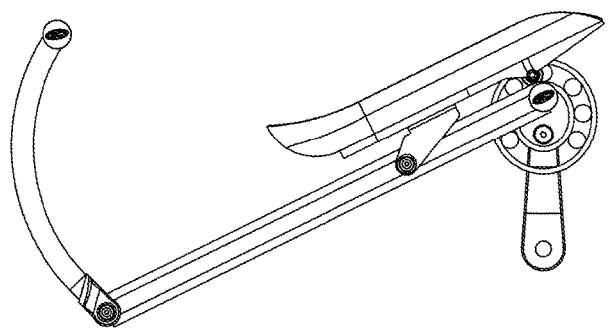
Figure 12H
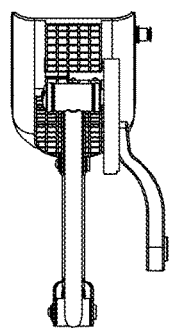
Figure 12I
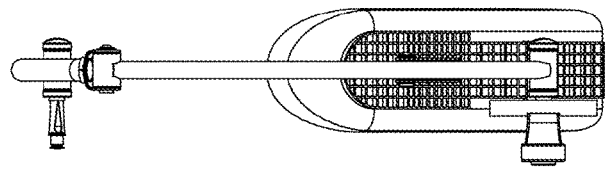

SECTION K-K

DRIVE MECHANISM WITH FOOT PLATFORM ANGLE ADJUSTMENT MECHANISM FOR ELLIPTICALLY-DRIVEN DEVICE

CROSS REFERENCE TO RELATED APPLICATION

This application claims the benefit of U.S. Provisional Patent Application No. 62/375,990, filed Aug. 17, 2016, which is incorporated by reference herein.

BACKGROUND

Field of the Invention

The present invention relates generally to elliptically-driven devices, and particularly to foot platforms of elliptically-driven device.

Related Art

An elliptical cycle operates by the user standing atop foot platforms and using his legs to stride forward and rearward in a generally elliptical or ovate path causing the rear wheel to rotate and propel the elliptical cycle. Many different versions of the elliptical cycle are known in the art, employing different mechanisms to transfer power from the user to the rear wheel. For example, in one version of an elliptical cycle, an elliptical or ovate path is created by a slider-crank mechanism comprised of guide tracks, drive arms and crank arms where a rear end of each drive arm is attached to a corresponding crank arm and a front end of each drive arm is attached to one or more load wheels situated on guide tracks that are attached to a frame of the elliptical cycle. When a user strides, the crank arms rotate in a generally circular motion and the load wheels at the front of each drive arm reciprocate linearly along the guide tracks, producing an elliptical or ovate motion at the foot platforms. This motion is passed through a transmission system that results in a rear wheel turning. Another version of an elliptical cycle uses a rocker-crank mechanism. In this version, the guide tracks and load wheels are replaced by rocker arms that attach to the frame at one end and to the front of the drive arms at the other. When the user strides, the crank arms move in a circle and the rocker arms reciprocate along an arc to produce a generally elliptical or ovate motion at the foot platforms.

On most elliptical cycles known in the art, the foot platform is fixed to the drive arm such that the angle of the rider's foot is determined by the angle of the drive arm throughout the pedaling stroke. On other elliptical cycles known in the art, the foot platform can pivot, thereby decoupling the angle of the rider's foot from the angle of the drive arm during the pedaling stroke.

SUMMARY

An aspect of the invention involves a camming foot platform on an elliptically-driven device. A camming foot platform allows the foot platform angle to vary relative to the drive arm angle throughout the pedaling stroke while still maintaining the feel of a stable platform to stand upon at all times. This allows for the use of a shorter drive arm than would be possible with a fixed foot platform to achieve a desired generally elliptical or ovate foot path without the feeling of instability that accompanies a pivoting platform. The shorter drive arm enables a reduction in the overall length of the elliptically-driven device's frame with a corresponding reduction in weight and cost. The camming foot platform's stability compared with a pivoting foot platform makes the rider feel more secure and less fatigued while riding. In some embodiments of the camming foot platform, the platform is large enough to enable the rider to significantly vary their foot position while riding which changes the foot path and workout experience. Elliptical cycles with simple pivoting foot platforms known in the art are constrained to one foot path while riding because the rider must maintain balance about the pivot point of the platform which is in a fixed location while riding.

For an elliptically-driven device, the foot path is determined by the drive arm length, the foot platform position on the drive arm, the crank arm length, the rocker arm length (if a rocker-crank mechanism) and the crank pivot offset from the reciprocating axis. Adjusting one or more of these factors will change the foot path. The ideal design usually involves setting these factors to provide the most comfortable and power-efficient foot path possible while minimizing the size of the frame.

In the example of an elliptical cycle, human anatomy limits the range of foot angles that are viable for powering an elliptical cycle. Extreme foot platform angles can be uncomfortable for the elliptical cycle rider. If the angle is too extreme at the top of the power stroke, it can put undue stress on the rider's knee and ankle joints. If the angle is too extreme at the bottom of the power stroke, it can aggravate the rider's Achilles tendon. Over time, either of these extremes can lead to injuries. For an elliptical cycle with fixed foot platforms attached directly to the drive arm, the pedal angle during the pedal stroke is determined by the drive arm angle. In turn, the drive arm angle during the pedal stroke is directly related to the length of the drive arm, the length of the crank arm to which it is attached and the crank pivot offset from the reciprocating axis. For a given crank arm length and crank pivot offset, shortening the drive arm increases the drive arm angles at both the top and bottom of the power stroke. For a given crank arm length and drive arm length, reducing the crank pivot offset decreases the drive arm angles at both the top and bottom of the power stroke. As a result, for elliptical cycles with fixed platforms, there is a minimum drive arm length that is viable for a given crank arm length and crank pivot offset. By using a camming foot platform, this minimum drive arm length can be shortened because the angle of the foot platform is determined by the camming system, not the angle of the drive arm. The camming system can be designed to ensure that the foot angle throughout the pedaling stroke is always at a comfortable angle even when the drive arm is at an angle that would be too extreme to be comfortable with a fixed foot platform. The drive arm length impacts the overall length of an elliptical cycle and the size of the frame. Shortening the drive arms can allow for the use of a smaller frame, which can result in significant cost savings for the manufacturer.

Another aspect of the invention involves a drive mechanism for an elliptically-driven device comprising a drive arm with a foot platform pivot assembly; a crank arm; a foot platform assembly pivotally coupled to the drive arm via the foot platform pivot assembly; a foot platform angle adjustment mechanism operably coupling the foot platform assembly to the crank arm so as to impart a foot platform angle of the foot platform assembly relative to the drive arm that varies during a stroke of the foot platform assembly.

One or more implementations of the aspect of the invention immediately above includes one or more of the following: the elliptically-driven device is an elliptical cycle; the elliptically-driven device is a stationary elliptical exercise machine; the elliptically-driven device is an elliptically driven watercraft; the foot platform angle adjustment mechanism is a cam assembly; the cam assembly is movable along the crank arm; the foot platform assembly includes a front pivot receiving portion which is pivotally connected to the foot platform pivot assembly and a rear cam follower portion which is at least one of sliding and rolling contact with the cam assembly; the cam assembly includes a closed ovate curve feature attached to the crank arm to which the rear cam follower portion makes at least one of sliding and rolling contact with throughout the stroke of the foot platform assembly; the cam assembly includes a protruding feature attached to the crank arm located a distance from a pivotal connection of the crank arm and the drive arm whereby the cam assembly engages the rear cam follower portion through only a portion of the stroke of the foot platform assembly; the foot platform pivot assembly is movable relative to the drive arm; the cam assembly includes a protruding feature attached to the crank arm located a distance from a pivotal connection of the crank arm and the drive arm whereby the cam assembly engages the rear cam follower portion through only a portion of the stroke of the foot platform assembly, and the foot platform pivot assembly is movable relative to the drive arm; the cam assembly includes a protruding feature movably attached to the crank arm to adjust a distance of the protruding feature from a pivotal connection of the crank arm and the drive arm whereby the cam assembly engages the rear cam follower portion through only a portion of the stroke of the foot platform assembly; the cam assembly captures the cam follower portion, preventing the cam follower portion from disengaging from the cam assembly; the front pivot receiving portion and rear cam follower portion of the foot platform assembly are incorporated integrally into the foot platform; the front pivot receiving portion and rear cam follower portion of the foot platform assembly are subassemblies; the rear cam follower portion includes at least one of a feature and surface directly on the foot platform assembly that makes sliding contact with the cam assembly; the rear cam follower portion includes an intermediary piece having a sliding interface, the intermediary piece is attached to an underside of the foot platform and is made of any of a multitude of different materials to optimize the durability and friction characteristics of the sliding interface; the rear cam follower portion includes an intermediary piece having a sliding interface, the intermediary piece is attached to an underside of the foot platform and has a varying profile in order further optimize the foot platform angle during the stroke of the foot platform assembly; the rear cam follower portion includes one or more of a simple roller and a bearing in rolling contact with the cam assembly; the front pivot receiving portion includes one or more of a spring element to bias the cam follower portion in contact with the cam assembly, a plain bearing, and a rolling element bearing; the cam assembly includes a feature attached to the crank arm to which the rear cam follower portion makes at least one of sliding and rolling contact with throughout the stroke of the foot platform assembly, and the feature is one of an integral part of the crank arm or a separate piece from the crank arm; the drive mechanism is a slider-crank mechanism; and/or the drive mechanism is a rocker-crank mechanism; the cam assembly includes a closed ovate curve feature attached to the crank arm to which the rear cam follower portion makes at least one of sliding and rolling contact with throughout the stroke of the foot platform assembly, and the foot platform pivot assembly is movable relative to the drive arm; and/or the cam assembly includes a closed ovate curve feature movably attached to the crank arm to which the rear cam follower portion makes at least one of sliding and rolling contact with throughout the stroke of the foot platform assembly.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1A is a perspective view of one embodiment of an elliptical cycle with a rocker-crank mechanism and a camming foot platform;

FIG. 11K is a side elevation view of the mechanism depicted in FIGS. 11A-11J that shows the change in foot platform angle at the bottom of the power stroke that results from moving the cam offset;

FIG. 12A is a side elevation view of another embodiment of a rocker-crank mechanism with a camming foot platform that shows the mechanism at the bottom of the power stroke;

FIG. 12B is a top plan view of the mechanism depicted in FIG. 12A;

FIG. 12C is a rear projection view of the mechanism depicted in FIG. 12A;

FIG. 12D is a bottom plan view of the mechanism depicted in FIG. 12A;

FIG. 12E is a front projection view of the mechanism depicted in FIG. 12A;

FIG. 12F is a side elevation view of the mechanism depicted in FIG. 12A that shows the mechanism at the top of the power stroke;

FIG. 12G is a top plan view of the mechanism depicted in FIG. 12F;

FIG. 12H is a rear projection view of the mechanism depicted in FIG. 12F;

FIG. 12I is a bottom plan view of the mechanism depicted in FIG. 12F;

FIG. 12J is a front projection view of the mechanism depicted in FIG. 12F;

DETAILED DESCRIPTION

Figure 1B:
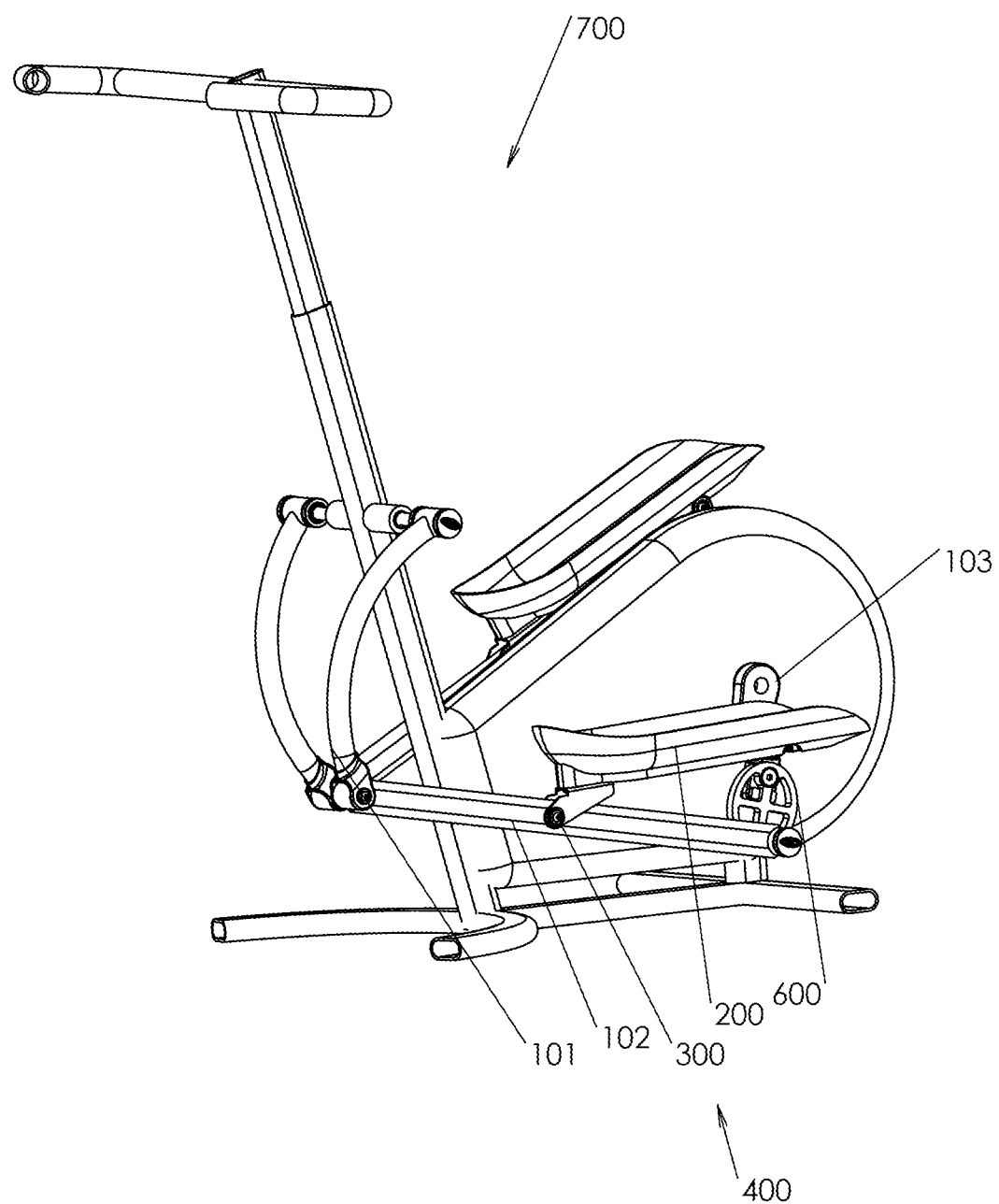
FIG. 1B is a view of an embodiment of a stationary elliptical exercise machine with a rocker-crank mechanism and a camming foot platform.
Figure 1C:
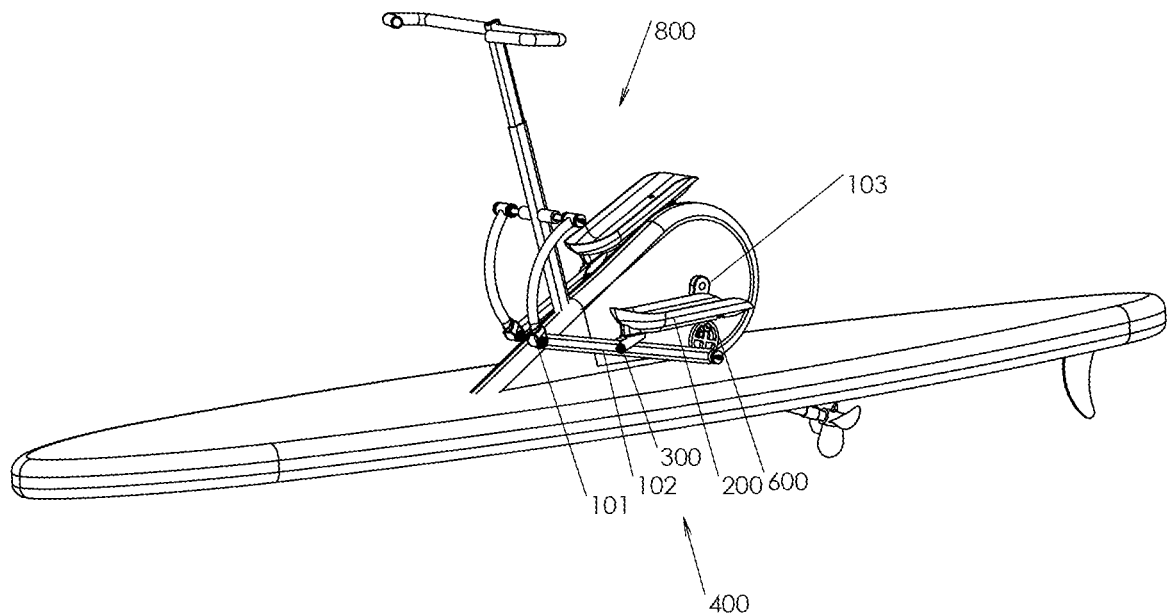
FIG. 1C is a view of an embodiment of an elliptically driven watercraft with a rocker-crank mechanism and a camming foot platform.

With reference to FIG. 1A, an embodiment of a rear-drive elliptical cycle 100 with short drive arms and camming foot platforms is shown. Before describing the camming foot platforms, the elliptical cycle will first be described. In alternative embodiments, the camming foot platforms are applied to other types of elliptically-driven human powered vehicles including, without limitation, elliptical cycles with two, three, or four wheels; elliptical cycles with arm levers in place of the handlebars. In a further embodiment, as shown in FIG. 1B, the camming foot platforms are applied to a stationary elliptical exercise machine 700 for commercial use and/or home use. In a further embodiment, as shown in FIG. 1C, the camming foot platforms are applied to an elliptically-driven watercraft 800. Thus, the camming foot platforms shown and described herein may be applied to elliptically-driven devices such as, but not limited to, elliptical cycles, elliptically-driven watercraft, and stationary elliptical exercise machines.

The elliptical cycle 100 includes a drive mechanism 400 mounted on a frame 106 on which one or more wheels (front wheel 107, rear wheel 108) are mounted. Generally, the drive mechanism 400 comprises either a slider-crank mechanism or a rocker-crank mechanism. A drive mechanism 400 comprised of a rocker-crank mechanism is depicted in FIG. 1A. In this embodiment, the rocker-crank mechanism is comprised of a rocker arm 101 pivotally coupled to the frame 106, a drive arm 102 pivotally coupled to the rocker arm 101 and to a crank arm 103, a foot platform pivot assembly 300 attached to the drive arm 102 and the foot platform assembly 200 attached to the foot platform pivot assembly 300, the crank arm 103 and the foot platform assembly 200 are in mechanical communication via a cam assembly 600.

An alternative embodiment of an elliptical cycle 100 employs a drive mechanism 400 comprised of a slider-crank mechanism. A slider-crank mechanism is comprised of a drive arm 102 movably coupled at its forward end to guide tracks coupled to, or integral with, the frame 106 and pivotally coupled at its rear end to a crank arm 103, a foot platform pivot assembly 300 attached to the drive arm 102 and a foot platform assembly 200 attached to the foot platform pivot assembly 300, the crank arm 103 and the foot platform assembly 200 are in mechanical communication via a cam assembly 600. Such an embodiment is created by replacing the foot link 205 and the foot platform 210 of FIG. 1 of Applicant's U.S. Pat. No. 7,717,446 (Exhibit A) with the drive arm 102, foot platform assembly 200, foot platform pivot assembly 300, and cam assembly 600 of FIG. 3B of the present application.

The front of the elliptical cycle includes the fork 122 rotatably mounted to the frame 106 and connected to the front wheel 107 and connected to the handlebars 121. This configuration allows the operator to steer the elliptical cycle 100.

The power transmission 109 connects the drive mechanism 400 to the rear wheel 108. During pedaling, the operator (not shown) uses his mass in a generally downward and rearward motion as in walking or jogging to exert a force on the foot platform assembly 200 and thereby, the drive arms 102. This force causes the rocker arm 101 to swing forward and then backward in an arc and the crank arms 103 to rotate in a circle. Through the power transmission 109 rotating the crank arms 103 causes the rear wheel 108 to rotate, providing propulsive power to the elliptical cycle.

In an alternative embodiment where the drive mechanism is a slider-crank mechanism, the pedaling process exerts a force on the foot platform assembly 200 and thereby, the drive arms 102, causing the drive arms to slide downward and rearward along the guide tracks and the crank arms 103 to rotate in a circle. Through the power transmission 109 rotating the crank arms 103 causes the rear wheel 108 to rotate, providing propulsive power to the elliptical cycle.

The connection between the crank arms 103 and rear wheel 108 can be achieved by a number of mechanisms known in the art, including, without limitation, a chain and sprocket or belt and timing gear, etc. The elliptical cycle 100 can employ a "fixed" or "free" rear wheel 108, as is known in the art. The elliptical cycle 100 can also employ a planetary gear hub or derailleur system having different gear ratios, as is known in the art.

Pedaling the elliptical cycle 100 as described above results in the operator's foot traveling in a shape that can be described as generally elliptical or ovate. Propulsion using an elliptical or ovate pedaling motion, as opposed to an up-and-down pedaling motion or a circular pedaling motion, has the advantage of better emulating a natural human running or walking motion. Further, an elliptical or ovate pedaling motion is a simpler and a more efficient means to power a cycle than is, for example, a vertical pumping motion. Moreover, the major axis of the ellipse in an elliptical or ovate pedaling motion can be substantially longer than the stroke length of a circular or vertical pumping pedaling motion, allowing the operator to employ a larger number of muscle groups over a longer range of motion during the pedal stroke than he or she could employ in a circular or up and down pedaling motion.

Figure 2A:
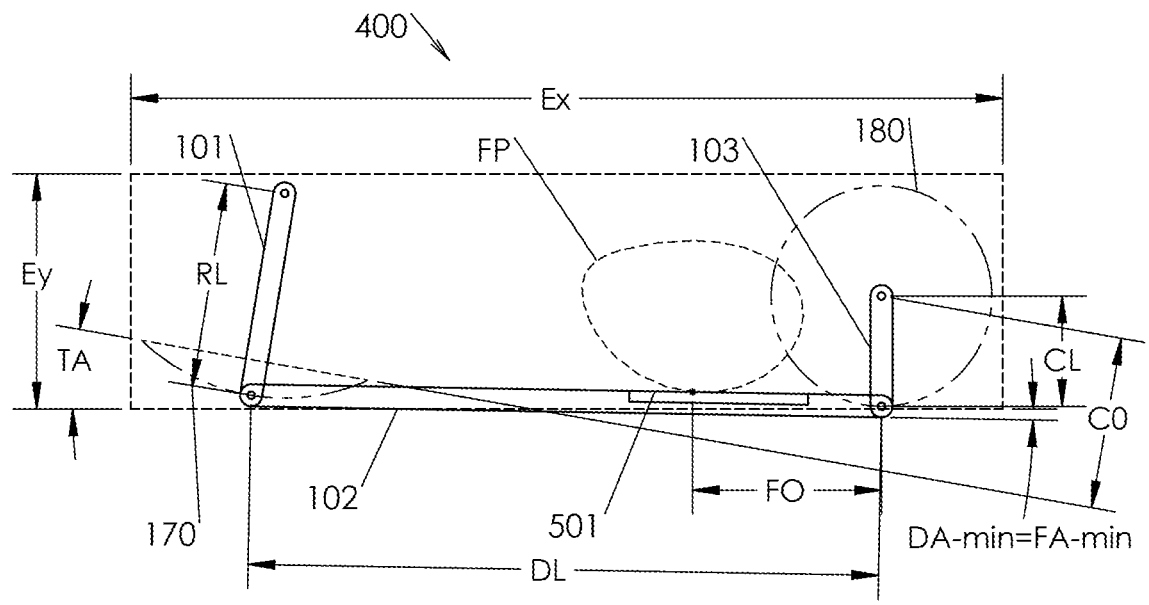
FIG. 2A is a side elevation view of one embodiment of a rocker-crank mechanism with a long drive arm and a fixed foot platform that shows the mechanism at the bottom of the power stroke and the foot path that results from actuating the mechanism.
Figure 2B:
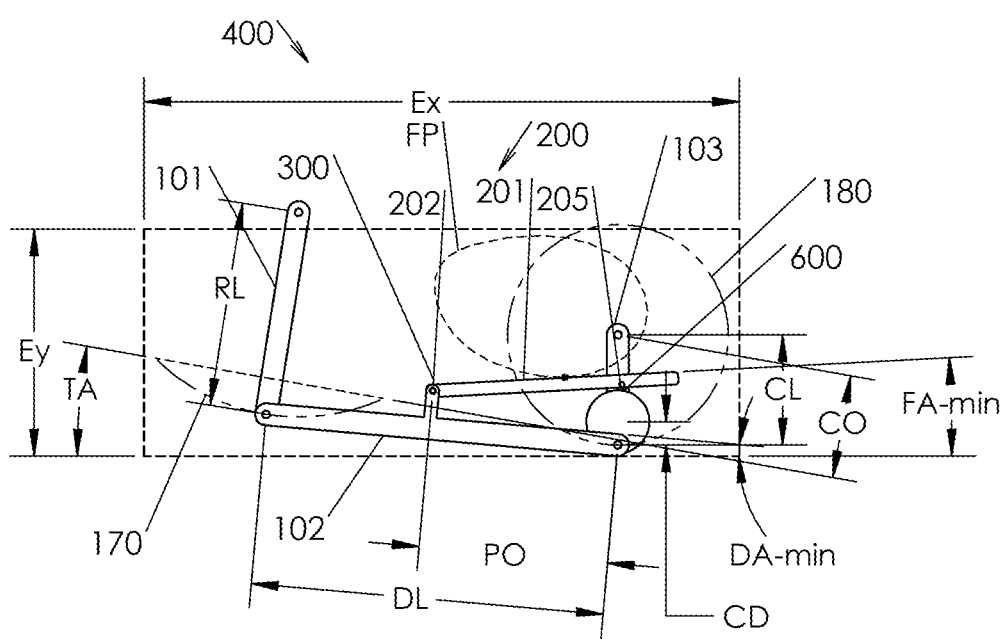
FIG. 2B is a side elevation view of one embodiment of a rocker-crank mechanism with a short drive arm and a camming foot platform that shows the mechanism at the bottom of the power stroke and the resulting foot path that is substantially similar to the one in FIG. 2A.

Referring now to FIG. 2B, the camming foot platform will now be described in more detail. An embodiment of the camming foot platform includes a foot platform assembly 200 connected to a foot platform pivot assembly 300 which is in turn coupled to a drive arm 102. The drive arm 102 is pivotally attached to the crank arm 103 which is in mechanical communication with the foot platform assembly 200 via the cam assembly 600. The foot platform assembly 200 includes a foot platform 201 that is designed to receive the rider's foot. The foot platform assembly 200 has a front pivot receiving portion 202 which is pivotally connected to the foot platform pivot assembly 300. The foot platform assembly 200 also has a rear cam follower portion 205 which is in sliding and/or rolling contact with the cam assembly 600. The front pivot receiving portion 202 allows the foot platform assembly 200 to rotate as the rear cam follower portion 205 moves along the cam assembly 600 throughout the pedal stroke thus rigidly controlling the foot platform angle FA. The front pivot receiving portion 202 and rear cam follower portion 205 of the foot platform assembly 200 could be incorporated integrally into the foot platform 201 itself or they could be implemented as sub-assemblies with separate brackets and hardware as is known in the art. The rear cam follower portion 205 may include a feature or surface on the foot platform 201 directly that makes sliding contact with the cam assembly 600 or the rear cam follower portion 205 may include an intermediary piece attached to the underside of the foot platform 201 made of any of a multitude of different materials, in order to optimize the durability and friction characteristics of this sliding interface. This intermediary piece could also have different linear or curved profiles in order further optimize the foot platform angle FA throughout the pedal stroke. The rear cam follower portion 205 may also include, but is not limited to, any of the following elements in rolling contact with the cam assembly 600: a simple roller made of any of a multitude of different materials including metals and polymers, a bearing such as a radial ball bearing with or without an attached tread or casing made from a polymer or other material. The front pivot receiving portion 202 could be implemented with, but not limited to, any of the following additional features such as plain or rolling element bearing in order to minimize friction, a spring element such as a torsion spring in order to keep the cam follower portion 205 preloaded in contact with the cam assembly 600. In FIG. 2B the cam assembly 600 includes a closed ovate curve feature attached to the crank arm 103 to which the rear cam follower portion 205 of the foot platform assembly 200 makes sliding and/or rolling contact with throughout the pedal stroke. This cam feature could be implemented as an integral part of the crank arm 103 itself or as a separate piece which is mechanically attached to the crank arm 103. This separate piece could be made of any of a multitude of different materials, in order to optimize the durability and friction characteristics of this interface. The cam assembly 600 could also be movable along the crank arm 103 in order to be able to adjust the behavior of the foot platform angle FA throughout the pedal stroke. Decreasing the cam offset CD would decrease the foot platform angle FA at the bottom of the stroke and increase the foot platform angle FA at the top of the stroke.

The foot platform pivot assembly 300 pivotally attaches the front pivot receiving portion 205 of the foot platform assembly 200 to the drive arm 102. In its simplest form the foot platform pivot assembly 300 includes a fixed hole in the drive arm structure to which the foot platform assembly 200 attaches to via a fastener such as a pin, axle or screw. It could also be implemented via a separate bracket assembly which is mechanically attached to the drive arm structure via welding, bonding or other mechanical fastening methods known in the art. It could also be implemented as a movable bracket assembly in order to be able to adjust the behavior of the foot platform angle FA throughout the pedal stroke. For a given cam assembly 600 and cam follower 205, decreasing the pivot offset PO would make the foot platform angle FA more positive at the bottom of the stroke and less positive at the top of the stroke. The foot platform pivot assembly 300 could be implemented with, but not limited to, any of the following additional features such as a plain or rolling element bearing in order to minimize friction, a spring element such as a torsion spring in order to keep the cam follower portion 205 preloaded in contact with the cam assembly 600.

Figure 2C:
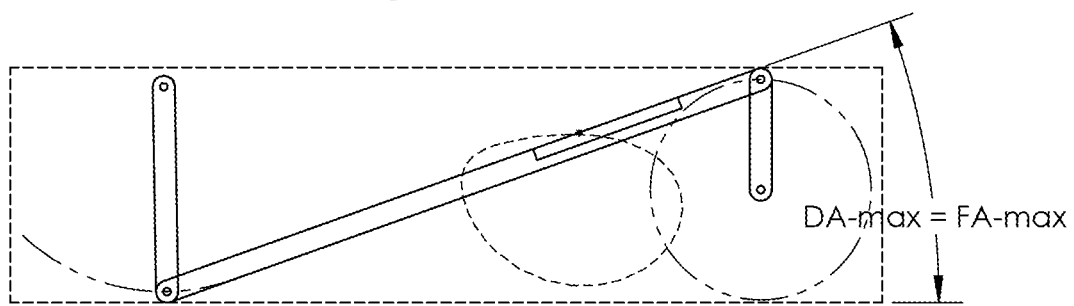
FIG. 2C is a side elevation view of the mechanism depicted in FIG. 2A that shows the mechanism at the top of the power stroke.

Turning now to FIGS. 2A-2D and FIGS. 3A-3D, the advantages of a camming foot platform are depicted. FIGS. 2A and 2C show one embodiment of a rocker-crank elliptical mechanism with a fixed foot platform. In FIG. 2A, the mechanism is at the bottom of the power stroke. In FIG. 2C, the mechanism is at the top of the power stroke. In this embodiment, drive arm 102 is pivotally connected at its forward end to rocker arm 101 and at its rearward end to crank arm 103. When the rider applies propulsive force to the mechanism, rocker arm 101 reciprocates back and forth along arc 170 and crank arm 103 rotates in circular motion 180. Foot path FP is the generally elliptical or ovate path of travel that the rider's foot will move through during the pedaling process. It is determined by foot offset FO, crank arm length CL, drive arm length DL, rocker arm length RL, crank pivot offset CO, and track angle TA. In this embodiment, fixed foot platform 501 is rigidly connected to drive arm 102 such that drive arm angle DA equals foot angle FA. Horizontal envelope Ex shows the forward and rearward extent of the moving parts of the depicted mechanism. Vertical Envelope Ey shows the upper and lower extent of the moving parts of the depicted mechanism.

Figure 2D:
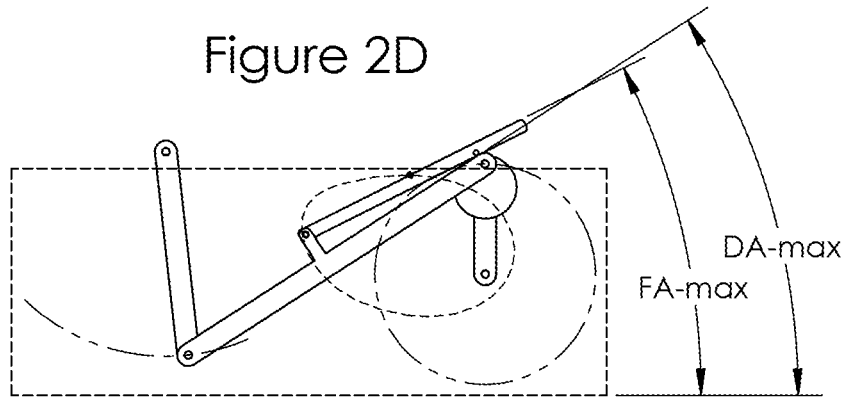
FIG. 2D is a side elevation view of the mechanism depicted in FIG. 2B that shows the mechanism at the top of the power stroke.

FIGS. 2B and 2D depict an embodiment of a rocker-crank elliptical mechanism with a camming foot platform. This embodiment has the same functional structure of a rocker arm 101, a drive arm 102, and a crank arm 103, and substantially similar foot paths FP as the embodiments in FIGS. 2A and 2C. However, drive arm length DL in FIGS. 2B and 2D is 44% shorter than drive arm length DL in FIGS. 2A and 2C and the horizontal envelope Ex in FIGS. 2B and 2D is 32% shorter than the horizontal envelope Ex in FIGS. 2A and 2C. This significant reduction in drive arm length DL and horizontal envelope Ex enables the use of a much smaller frame 106 to support the elliptical mechanism in FIGS. 2B and 2D than that in FIGS. 2A and 2C while providing substantially similar riding experiences and benefits to the rider.

This reduction in frame size and corresponding cost savings and performance improvements are primarily attributable to the use of a camming foot platform in place of a fixed foot platform. As shown in FIGS. 2A and 2C, when using a fixed foot platform, the foot angle FA is directly tied to the drive arm angle DA. As shown in FIGS. 2B and 2D, with a camming foot platform, the camming mechanism can correct the foot angle FA throughout the pedal stroke to be less extreme than the resulting drive arm angle DA. This enables the use of shorter drive arms 102 without subjecting the rider to extreme foot platform angles that are uncomfortable and stressful on the rider's knee and ankle joints or Achilles tendon. For example, in FIG. 2B, the minimum drive arm angle DA is significantly negative while the foot angle FA remains slightly positive, allowing the rider to avoid the strain to the Achilles tendon discussed above. Similarly, in FIG. 2D, the camming foot platform allows the foot angle FA to be less extreme than the drive arm angle DA, reducing any knee and/or ankle discomfort.

Figure 3A:
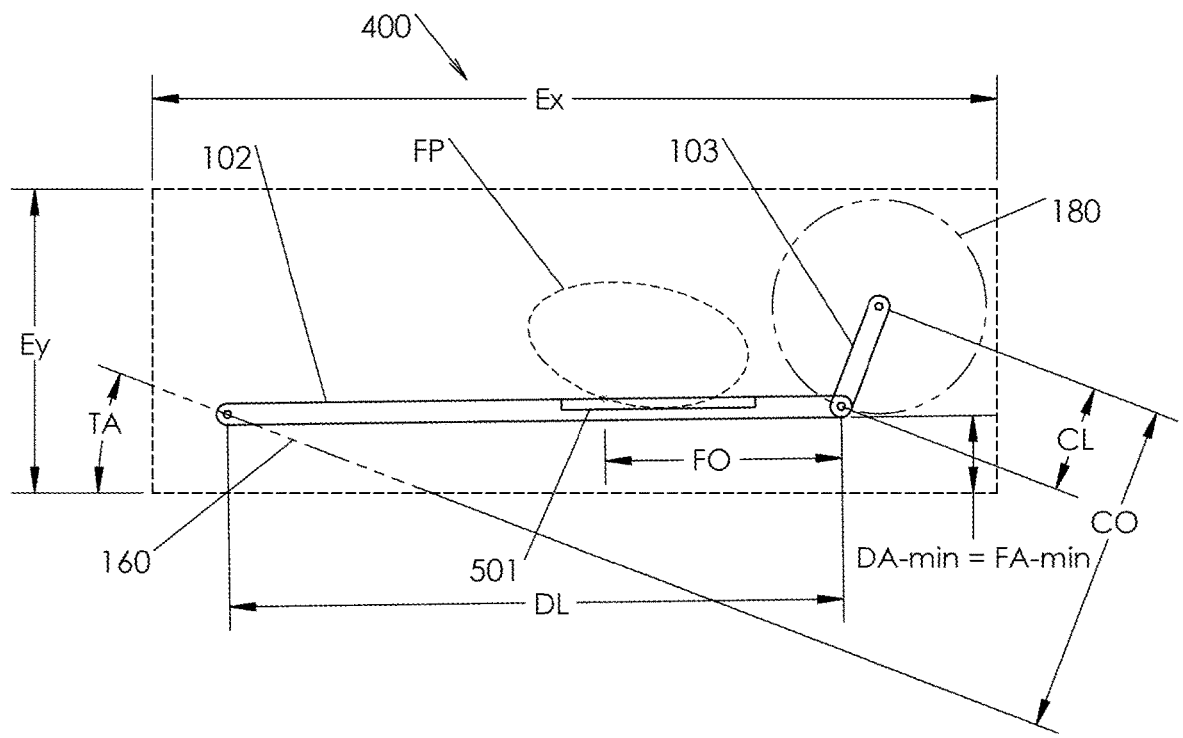
FIG. 3A is a side elevation view of one embodiment of a slider-crank mechanism with a long drive arm and a fixed foot platform that shows the mechanism at the bottom of the power stroke and the foot path that results from actuating the mechanism.
Figure 3B:
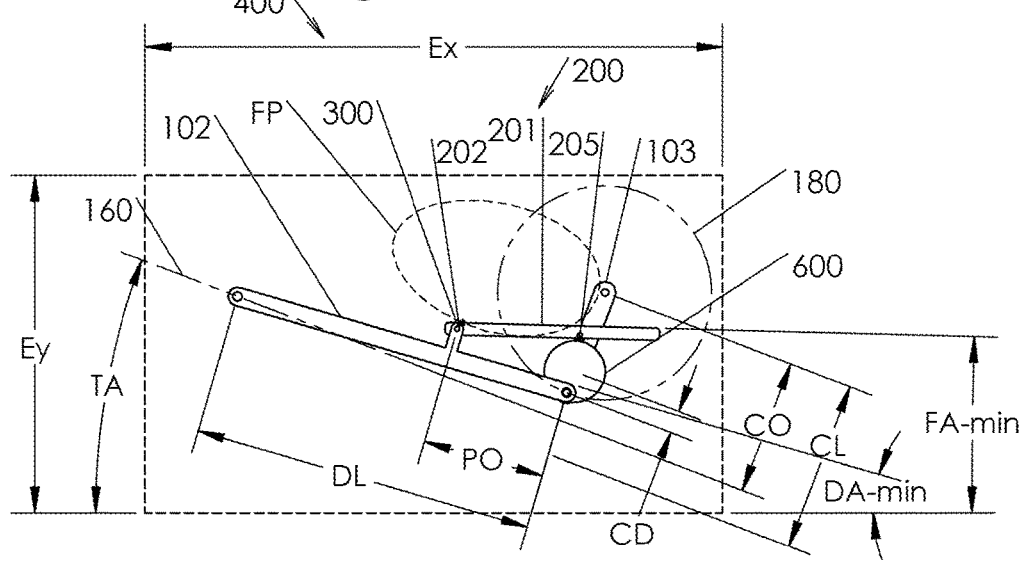
FIG. 3B is a side elevation view of one embodiment of a slider-crank mechanism with a short drive arm and a camming foot platform that shows the mechanism at the bottom of the power stroke and the resulting foot path that is substantially similar to the one in FIG. 3A.
Figure 3C:
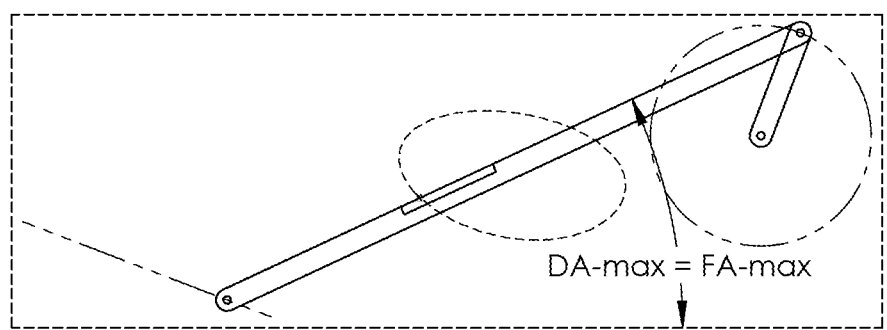
FIG. 3C is a side elevation view of the mechanism depicted in FIG. 3A that shows the mechanism at the top of the power stroke.

FIGS. 3A-3D show a similar benefit of camming foot platforms on elliptical cycles employing slider-crank mechanisms. FIGS. 3A and 3C show one embodiment of a slider-crank elliptical mechanism with a fixed foot platform. In this embodiment, drive arm 102 is coupled at its forward end to a guide track system 160 and at its rearward end to a crank arm 103. When the rider applies propulsive force to the mechanism, the front end of the drive arm 102 travels back and forth along the guide track system 160 while the crank arm 103 rotates in a circular motion 180. As in FIGS. 2A-2D above, foot path FP is the elliptical or ovate path of travel that the rider's foot will move through during the pedaling process and is determined by foot offset FO, crank arm length CL, drive arm length DL, crank pivot offset CO and track angle TA. In the embodiment depicted in FIGS. 3A and 3C, fixed foot platform 501 is rigidly connected to drive arm 102 such that drive arm angle DA equals foot angle FA. Horizontal envelope Ex shows the forward and rearward extent of the moving parts of the depicted mechanism. Vertical envelope Ey shows the upper and lower extent of the moving parts of the depicted mechanism. In FIG. 3A, the mechanism is at the bottom of the power stroke. In FIG. 3C, the mechanism is at the top of the power stroke.

Figure 3D:
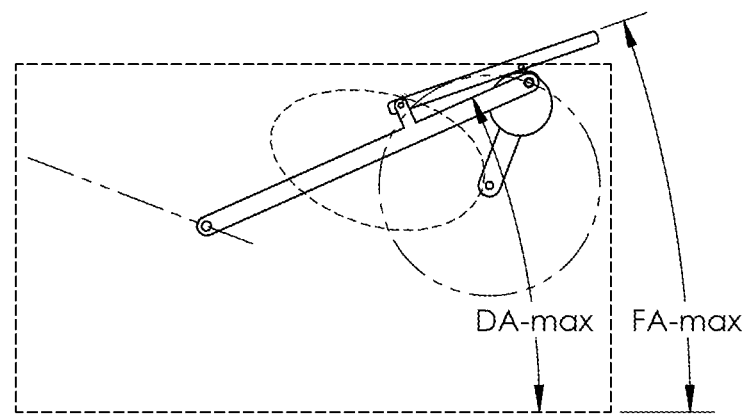
FIG. 3D is a side elevation view of the mechanism depicted in FIG. 3B that shows the mechanism at the top of the power stroke.

FIGS. 3B and 3D depict an embodiment of a slider-crank elliptical mechanism with a camming foot platform. This embodiment has the same functional structure of a drive arm 102, guide tracks 160 and a crank arm 103, and substantially similar foot paths FP as the embodiments in FIGS. 3A and 3C. However, drive arm length DL in FIGS. 3B and 3D is 44% shorter than drive arm length DL in FIGS. 3A and 3C and the horizontal envelope Ex in FIGS. 3B and 3D is 32% shorter than the horizontal envelope Ex in FIGS. 3A and 3C. As with FIGS. 2A-2D above, this significant reduction in drive arm length DL and horizontal envelope Ex enables the use of a much smaller frame 106 to support the elliptical mechanism in FIGS. 3B and 3D than that in FIGS. 3A and 3C while providing substantially similar riding experiences and benefits to the rider.

Again, this reduction in frame size and corresponding cost savings and performance improvements are primarily attributable to the use of a camming foot platform in place of a fixed foot platform for the same reason and with a similar effect as with FIGS. 2B and 2D above. Namely, that the camming mechanism can allow the foot angle FA throughout the pedal stroke to be less extreme than the resulting drive arm angle DA, enabling the use of shorter drive arms 102 without subjecting the rider to extreme foot platform angles that are uncomfortable and stressful on the rider's knee and ankle joints or Achilles tendon.

As discussed above, one element that determines the shape of the ovate or generally elliptical path is the foot offset FO. Keeping the other elements the same, changing the position of the rider's foot on the drive arm 102 will change the shape of the ovate or elliptical foot path FP. Moving the rider's foot to the rear on the drive arm towards the crank arm increases the vertical component "b-axis" of the ovate motion. Moving the rider's foot forward on the drive arm decreases the vertical component "b-axis" of the ovate motion. Moving the rider's foot along the drive arm in either direction does not materially change the horizontal component "a-axis" of the ovate motion. The rider's foot position on the drive arm 102 can be changed by either moving the rider's foot on a larger foot platform assembly 200 or by moving the foot platform assembly 200 along the drive arm 102. Unlike the simple pivoting foot platforms known in the art, a camming foot platform allows the rider to change foot positions and therefore the workout experience while riding. Elliptical cycles with simple pivoting are effectively limited to a single distinct foot path while riding because the rider must maintain balance about the pivot point of the platform. Changing the location of the rider's foot on these systems requires moving the foot platform pivot point along the drive arm, which can only be done while stopped.

Figure 4A:
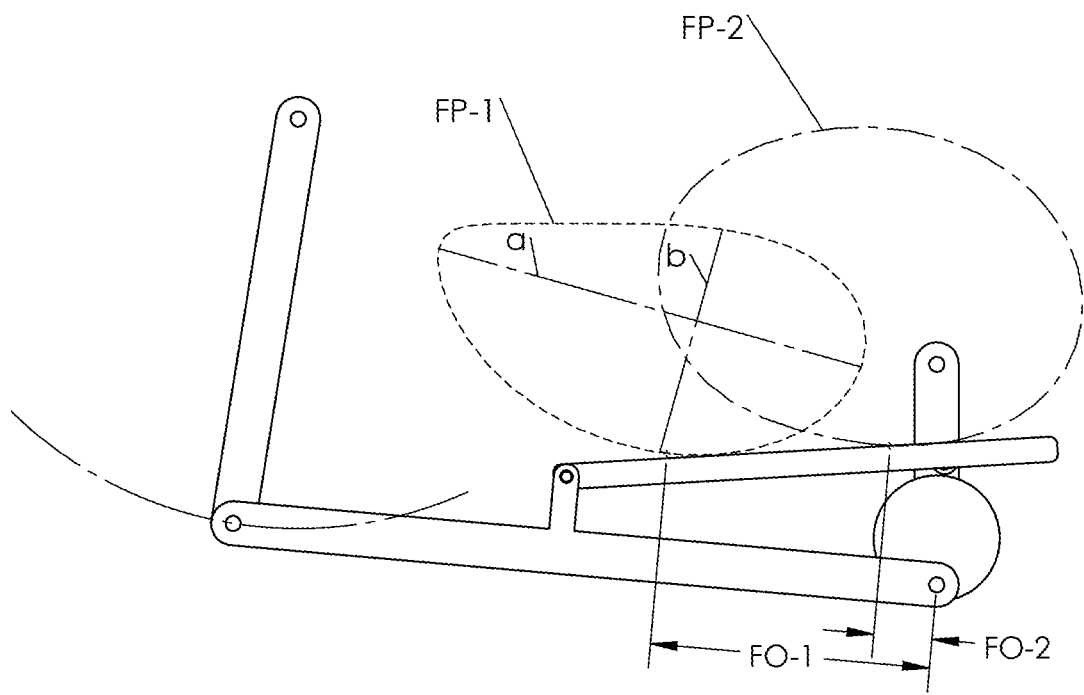
FIG. 4A is a side elevation view of one embodiment of a rocker-crank mechanism with a short drive arm and a camming foot platform that shows the change in the foot path that results from moving the rider's foot into different positions on the foot platform.
Figure 4B:
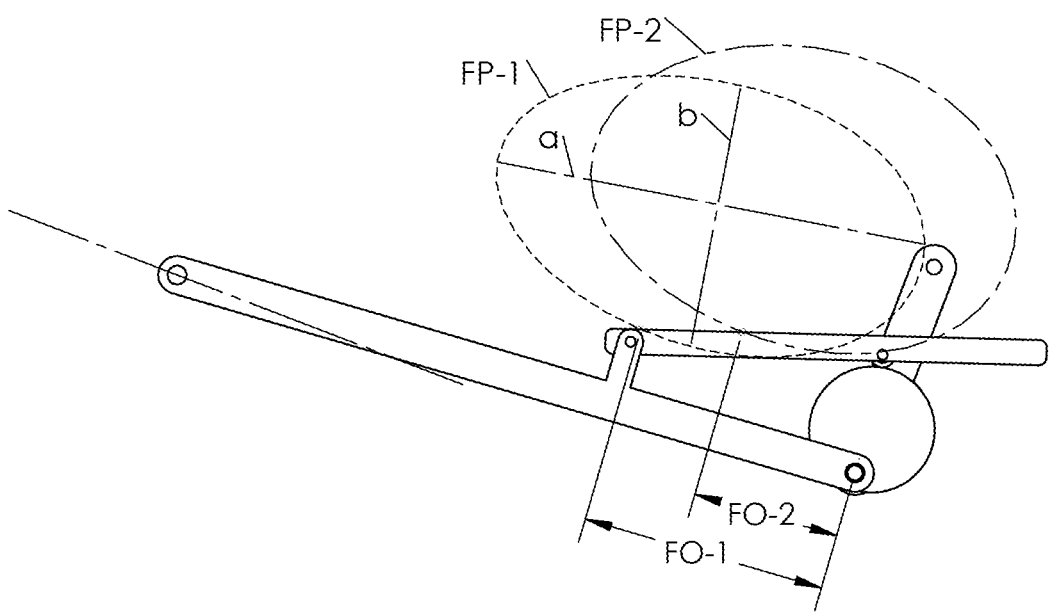
FIG. 4B is a side elevation view of one embodiment of a slider-crank mechanism with a short drive arm and a camming foot platform that shows the change in the foot path that results from moving the rider's foot into different position on the foot platform.

FIG. 4A depicts one embodiment of a rocker-crank mechanism with a short drive arm 102 and camming foot platform that shows how moving the rider's foot position on the foot platform assembly 200 modifies the vertical component "b-axis" of the foot path FP. Foot path 1 FP-1 is the path of travel that the rider's foot would take on this elliptical mechanism with the rider's foot position located at foot offset 1 FO-1. Foot path 2 FP-2 is the path of travel that the rider's foot would take on this elliptical mechanism with the foot platform located at foot offset 2 FO-2. Foot offset 1 FO-1 is further forward on the drive arm so foot path 1 FP-1 has a smaller vertical component "b-axis" when compared to foot path 2 FP-2. FIG. 4B depicts one embodiment of a slider-crank mechanism with a short drive arm 102 and camming foot platform that shows how the rider's foot can be positioned at different locations on the foot platform assembly 200 resulting in a different foot path FP. As with FIG. 4A, because foot offset 1 FO-1 is further forward on the drive arm so foot path 1 FP-1 has a smaller vertical component "b-axis" when compared to foot path 2 FP-2. Registration systems such as, but not limited to, markings, ribs, protrusions, cleats or toe cages could be used to allow for repeatable placement, adjustment and/or retention of the rider's foot on the camming foot platform.

Figure 5A:
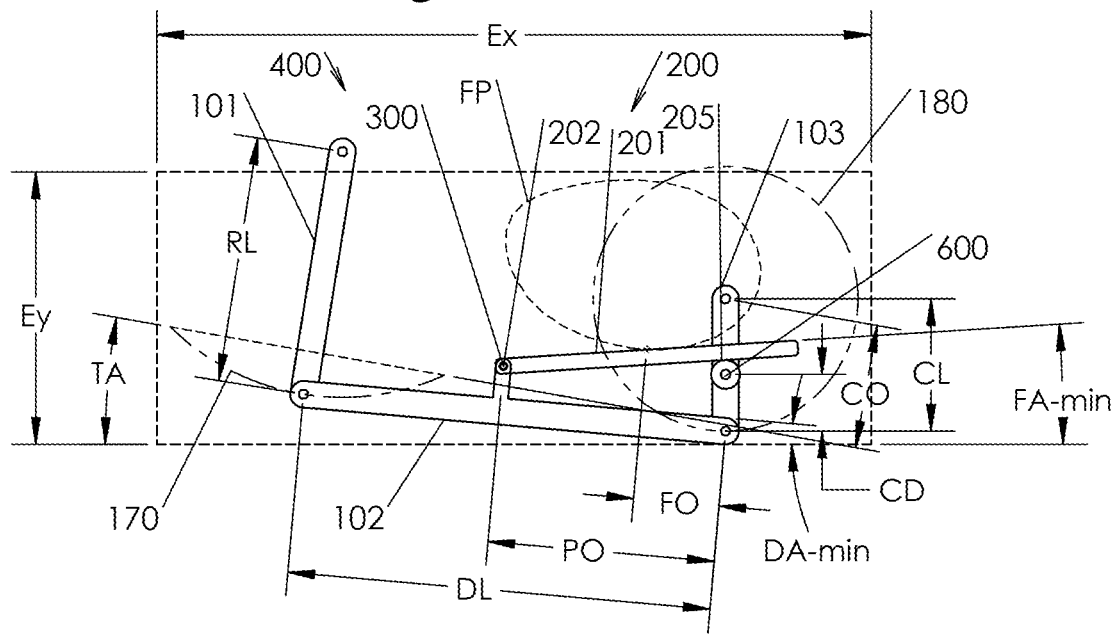
FIG. 5A is a side elevation view of another embodiment of a rocker-crank mechanism with a short drive arm and a camming foot platform that shows the mechanism at the bottom of the power stroke and the resulting foot path that is substantially similar to the one in FIG. 2A.
Figure 5B:
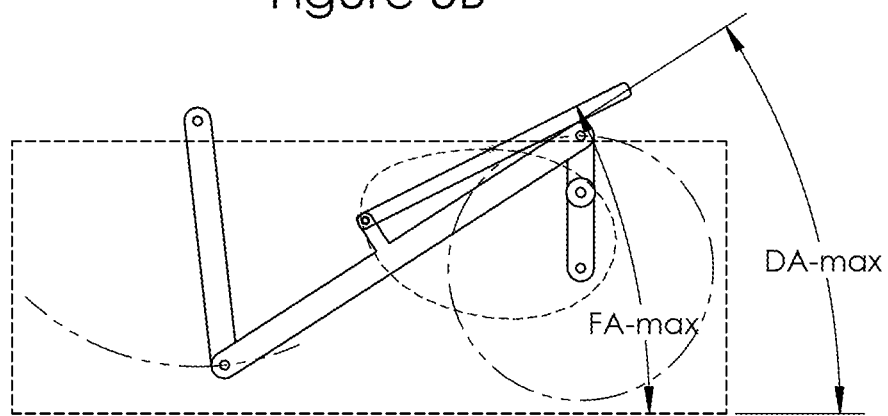
FIG. 5B is a side elevation view of the mechanism depicted in FIG. 5A that shows the mechanism at the top of the power stroke.
Figure 6A:
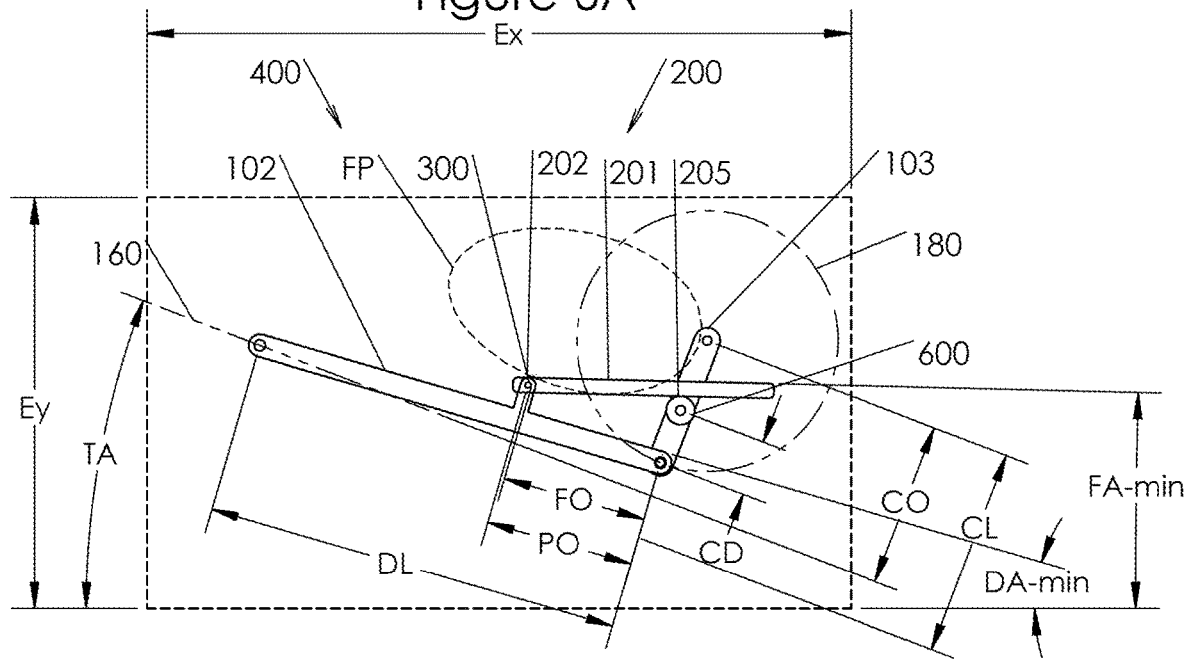
FIG. 6A is a side elevation view of another embodiment of a slider-crank mechanism with a short drive arm and a camming foot platform that shows the mechanism at the bottom of the power stroke and the resulting foot path that is substantially similar to the one in FIG. 3A.
Figure 6B:
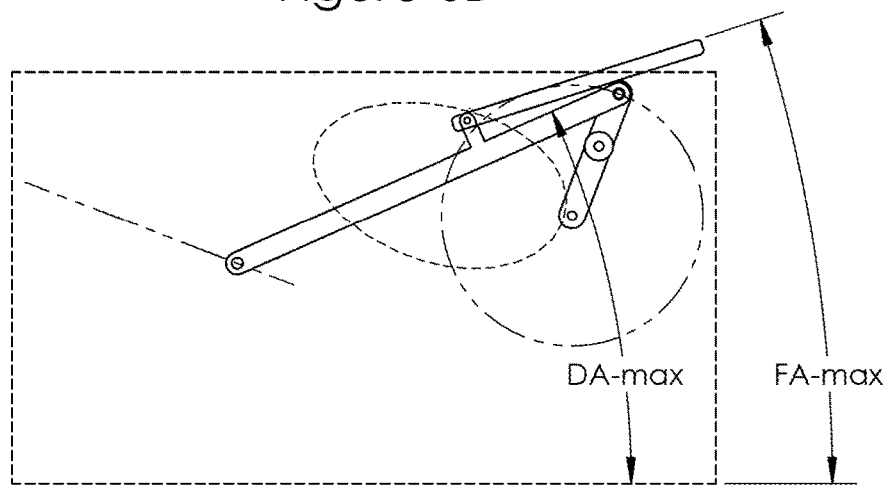
FIG. 6B is a side elevation view of the mechanism depicted in FIG. 6A that shows the mechanism at the top of the power stroke.
Figure 7B:
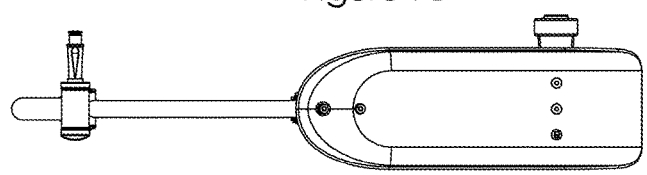
FIG. 7B is a top plan view of the mechanism depicted in FIG. 7A.
Figure 7E:
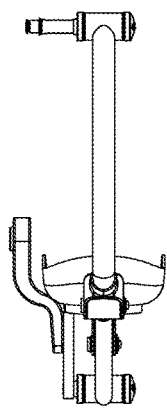
FIG. 7E is a front projection view of the mechanism depicted in FIG. 7A.
Figure 7A:
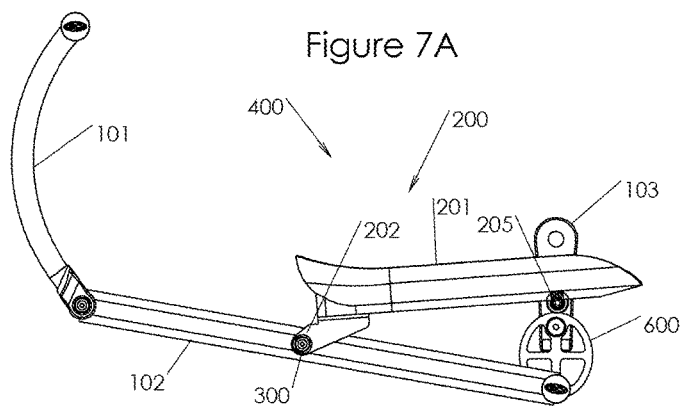
FIG. 7A is a side elevation view of another embodiment of a rocker-crank mechanism with a camming foot platform that shows the mechanism at the bottom of the power stroke.
Figure 7C:
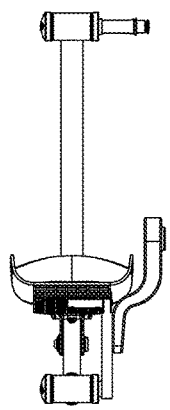
FIG. 7C is a rear projection view of the mechanism depicted in FIG. 7A.
Figure 7D:
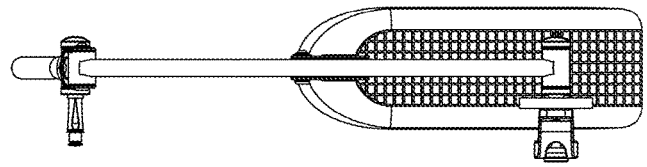
FIG. 7D is a bottom plan view of the mechanism depicted in FIG. 7A.
Figure 7G:
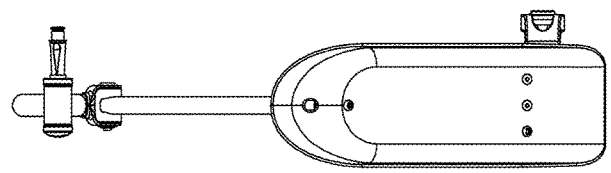
FIG. 7G is a top plan view of the mechanism depicted in FIG. 7F.
Figure 7J:
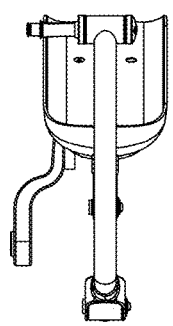
FIG. 7J is a front projection view of the mechanism depicted in FIG. 7F.
Figure 7F:
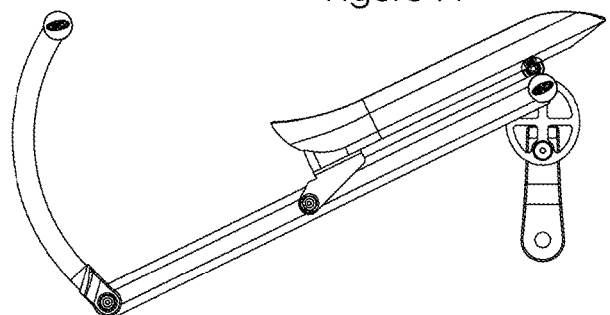
FIG. 7F is a side elevation view of the mechanism depicted in FIG. 7A that shows the mechanism at the top of the power stroke.
Figure 7H:
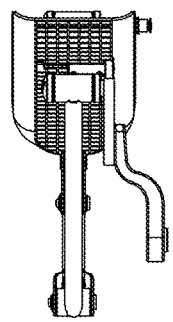
FIG. 7H is a rear projection view of the mechanism depicted in FIG. 7F.
Figure 7I:
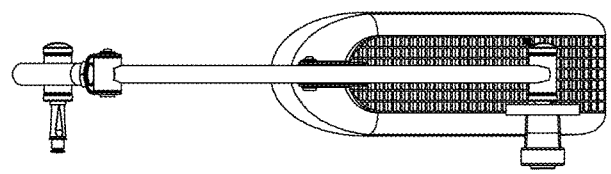
FIG. 7I is a bottom plan view of the mechanism depicted in FIG. 7F.

FIGS. 5A and 5B depict an alternate embodiment of a rocker-crank mechanism with a short drive arm 102 and camming foot platform assembly 200. In this embodiment the cam assembly 600 includes a protruding feature attached to the crank arm 103 located above the pivotal connection of the crank arm 103 and drive arm 102 instead of a closed ovate curve shaped feature which encompasses the pivot as shown in FIGS. 2B and 2D. In this embodiment the cam assembly 600 engages the rear cam follower portion 205 of the foot platform assembly 200 through only a portion of the pedal stroke, instead of staying in continuous contact as with the embodiments shown in FIGS. 2B and 2D. When the cam assembly 600 makes contact with the foot platform assembly 200 it lifts the rear end thus correcting the foot platform angle FA relative to the drive arm angle DA. FIG. 5A shows the mechanism at the bottom of the power stroke where the cam assembly 600 is substantially engaged with the rear cam follower portion 205 of the foot platform 200. FIG. 5B shows the mechanism at the top of the return stroke where the cam assembly 600 is disengaged and the foot platform assembly 200 stops on the back of the drive arm. FIGS. 6A and 6B depict an alternate embodiment of a slider-crank mechanism with a short drive arm 102 and camming foot platform assembly 200. In this embodiment the cam assembly 600 includes a protruding feature attached to the crank arm 103 located above the pivotal connection of the crank arm 103 and drive arm 102 instead of a closed ovate curve shaped feature which encompasses the pivot as shown in FIGS. 3B and 3D. In this embodiment the cam assembly 600 engages the rear cam follower portion 205 of the foot platform assembly 200 through only a portion of the pedal stroke, instead of staying in continuous contact as with the embodiments shown in FIGS. 3B and 3D. When the cam assembly 600 makes contact with the foot platform assembly 200 it lifts the rear end thus correcting the foot platform angle FA relative to the drive arm angle DA. FIG. 6A shows the mechanism at the bottom of the power stroke where the cam assembly 600 is substantially engaged with the rear cam follower portion 205 of the foot platform 200. FIG. 6B shows the mechanism at the top of the return stroke where the cam assembly 600 is disengaged and the foot platform assembly 200 stops on the back of the drive arm. In FIGS. 5A-6B the cam assembly 600 may include, but is not limited to, any of the following: a simple protruded feature which is integral to the crank arm 103, a simple roller pivotally attached to the crank arm 103 made of any of a multitude of different materials including metals and polymers, a bearing such as a radial ball bearing pivotally attached to the crank arm 103 with or without an attached tread or casing made from a polymer material. The cam assembly 600 could also be movable along the crank arm 103 in order to be able to adjust the behavior of the foot platform angle FA throughout the pedal stroke. Decreasing the cam offset CD would decrease the foot platform angle FA at the bottom of the stroke and have no effect at the top of the stroke where the cam assembly 600 is disengaged and the foot platform assembly 200 stops on the back of the drive arm. The front pivot receiving portion 202 and rear cam follower portion 205 of the foot platform assembly 200 could be incorporated integrally into the foot platform 201 itself or they could be implemented as sub-assemblies with separate brackets and hardware as is known in the art. The rear cam follower portion 205 of the foot platform assembly 200 may include a feature or surface on the foot platform 201 directly that makes sliding and/or rolling contact with the protruded feature of cam assembly 600 or may include an intermediary piece attached to the underside of the foot platform 201 made of any of a multitude of different materials, in order to optimize the durability and friction characteristics of this sliding interface. This intermediary piece could also have different linear or curved profiles in order further optimize the foot platform angle FA throughout the pedal stroke. In FIGS. 5B and 6B the foot platform 201 could stop directly on the top of the drive arm or there could be an intermediary interface made of any of a multitude of different materials attached to either the foot platform 201 and/or the drive arm 102 in order to optimize the durability and friction characteristics of this interface and/or dampen the impact energy and noise made by these parts contacting one another during the pedal stroke.

In FIGS. 5A-6B the foot platform pivot assembly 300 pivotally attaches the front pivot receiving portion 202 of the foot platform assembly 200 to the drive arm 102. In its simplest form the foot platform pivot assembly 300 may include a fixed hole in the drive arm structure to which the foot platform assembly 200 attaches to via a fastener such as a pin, axle or screw. It could also be implemented via a separate bracket assembly which is mechanically attached to the drive arm structure via welding, bonding or other mechanical fastening methods known in the art. It could also be implemented as a movable bracket assembly in order to be able to adjust the behavior of the foot platform angle FA throughout the pedal stroke. For a given cam assembly 600 and cam follower 205, decreasing the pivot offset PO would make the foot platform angle FA more positive at the bottom of the stroke and less positive at the top of the stroke. The interface between the foot platform pivot assembly 300 and the front pivot receiving portion 202 could be implemented with additional features, including, but not limited to, a plain or rolling element bearing in order to minimize friction; or a spring element such as a torsion spring in order to assist in keeping the cam follower portion 205 in contact with the cam assembly 600 or top of the drive arm 102 depending on pedal stroke position.

FIGS. 7A-7J depict an alternate embodiment of a rocker-crank mechanism with a short drive arm 102 and camming foot platform assembly 200 similar to the one depicted in FIGS. 2B and 2D. FIGS. 7A-7E show the mechanism at the bottom of the power stroke. FIGS. 7F-7J show the mechanism at the top of the power stroke. This embodiment of the camming foot platform includes a foot platform assembly 200 connected to a foot platform pivot assembly 300 which is in turn coupled to a drive arm 102. The drive arm 102 is pivotally attached to the crank arm 103 which is in mechanical communication with the foot platform assembly 200 via the cam assembly 600. The foot platform assembly 200 includes a foot platform 201 that is designed to receive the rider's foot. The foot platform assembly 200 has a front pivot receiving portion 202 which is pivotally connected to the foot platform pivot assembly 300. The foot platform assembly 200 also has a rear cam follower portion 205 which is in sliding and/or rolling contact with the cam assembly 600. The front pivot receiving portion 202 allows the foot platform assembly 200 to rotate as the rear cam follower portion 205 moves along the cam assembly 600 throughout the pedal stroke thus rigidly controlling the foot platform angle FA. The front pivot receiving portion 202 and rear cam follower portion 205 of the foot platform assembly 200 could be incorporated integrally into the foot platform 201 itself or they could be implemented as sub-assemblies with separate brackets and hardware as is known in the art. The rear cam follower portion 205 may simply include a feature or surface on the foot platform 201 directly that makes sliding contact with the cam assembly 600 or the rear cam follower portion 205 may include an intermediary piece attached to the underside of the foot platform 201 made of any of a multitude of different materials in order to optimize the durability and friction characteristics of this sliding interface. This intermediary piece could also have different linear or curved profiles in order further optimize the foot platform angle FA throughout the pedal stroke. The rear cam follower portion 205 may include any of the following elements in rolling contact with the cam assembly 600, including, but not limited to, a simple roller made of any of a multitude of different materials including metals and polymers, or a bearing such as a radial ball bearing with or without an attached tread or casing made from a polymer or other material. The front pivot receiving portion 202 could be implemented with additional features including, but not limited to, a plain or rolling element bearing in order to minimize friction; or a spring element such as a torsion spring in order to assist in keeping the cam follower portion 205 in contact with the cam assembly 600. The cam assembly 600 includes a closed ovate curve feature attached to the crank arm 103 with which the rear cam follower portion 205 of the foot platform assembly 200 makes sliding and/or rolling contact throughout the pedal stroke. This cam feature could be implemented as an integral part of the crank arm 103 itself or as a separate piece which is mechanically attached to the crank arm. This separate piece could be made of any of a multitude of different materials, in order to optimize the durability and friction characteristics of this interface. The cam assembly 600 could also be movable along the crank arm 103 in order to be able to adjust the behavior of the foot platform angle FA throughout the pedal stroke. Decreasing the cam offset CD would decrease the foot platform angle FA at the bottom of the stroke and decrease the foot platform angle FA at the top of the stroke.

The foot platform pivot assembly 300 pivotally attaches the front pivot receiving portion 205 of the foot platform assembly 200 to the drive arm 102. In its simplest form the foot platform pivot assembly 300 includes a fixed hole in the drive arm structure to which the foot platform assembly 200 attaches to via a fastener such as a pin, axle or screw. It could also be implemented via a separate bracket assembly which is mechanically attached to the drive arm structure via welding, bonding or other mechanical fastening methods known in the art. It could also be implemented as a movable bracket assembly in order to be able to adjust the behavior of the foot platform angle FA throughout the pedal stroke. For a given cam assembly 600 and cam follower 205, decreasing the pivot offset PO would make the foot platform angle FA more positive at the bottom of the stroke and less positive at the top of the stroke. The foot platform pivot assembly 300 could be implemented with additional features including, but not limited to, a plain or rolling element bearing in order to minimize friction; or a spring element such as a torsion spring in order to assist in keeping the cam follower portion 205 in contact with the cam assembly 600. The camming foot platform system depicted in this embodiment could alternatively be implemented on an elliptical cycle with a slider-crank mechanism by removing the swing arm 101 and by moveably coupling drive arm 102 at its forward end to guide tracks coupled to, or integral with, the frame of the elliptical cycle.

FIGS. 8A-8J depict an alternate embodiment of a rocker-crank mechanism with a short drive arm 102 and camming foot platform assembly 200 similar to the one depicted in FIGS. 5A and 5B. In this embodiment the cam assembly 600 includes a protruding feature attached to the crank arm 103 located above the pivotal connection of the crank arm 103 and drive arm 102 instead of a closed ovate curve shaped feature which encompasses the pivot as shown in FIGS. 7A-7J. In this embodiment the cam assembly 600 engages the rear cam follower portion 205 of the foot platform assembly 200 through only a portion of the pedal stroke, instead of staying in continuous contact like the embodiments shown in FIGS. 7A-7J. When the cam assembly 600 makes contact with the foot platform assembly 200 it lifts the rear end thus correcting the foot platform angle FA relative to the drive arm angle DA. FIGS. 8A-8E shows the mechanism at the bottom of the power stroke where the cam assembly 600 is substantially engaged with the rear cam follower portion 205 of the foot platform 200. FIGS. 8F-8J shows the mechanism at the top of the return stroke where the cam assembly 600 is disengaged and the foot platform assembly 200 stops on the back of the drive arm. In FIGS. 8A-8J the cam assembly 600 may include mechanisms such as, but not limited to, a simple protruded feature which is integral to the crank arm 103, a simple roller pivotally attached to the crank arm 103 which could be made of any of a multitude of different materials including metals and polymers, or a bearing such as a radial ball bearing pivotally attached to the crank arm 103 with or without an attached tread or casing made from a polymer material. The cam assembly 600 could also be movable along the crank arm 103 in order to be able to adjust the behavior of the foot platform angle FA throughout the pedal stroke. Decreasing the cam offset CD would decrease the foot platform angle FA at the bottom of the stroke and have no effect at the top of the stroke where the cam assembly 600 is disengaged and the foot platform assembly 200 stops on the back of the drive arm.

Figure 8B:
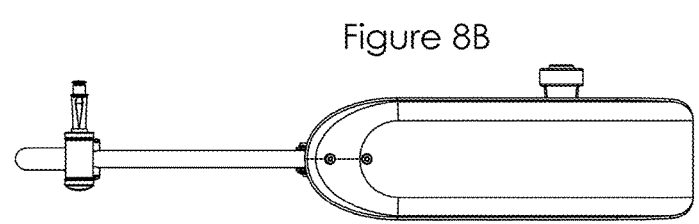
FIG. 8B is a top plan view of the mechanism depicted in FIG. 8A.
Figure 8E:
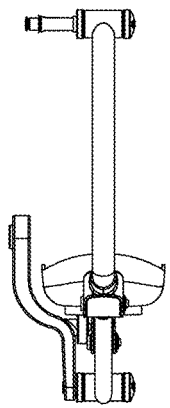
FIG. 8E is a front projection view of the mechanism depicted in FIG. 8A.
Figure 8A:
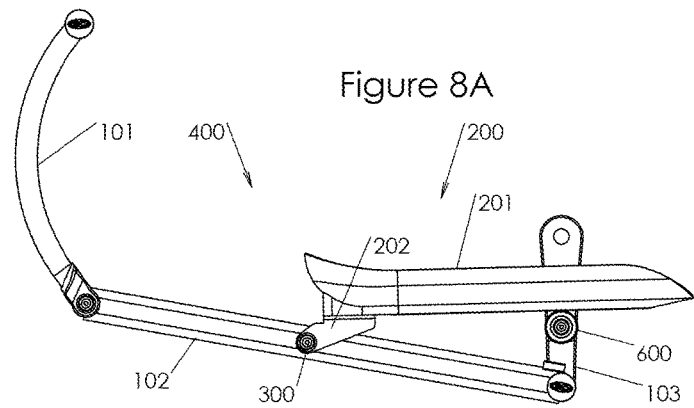
FIG. 8A is a side elevation view of another embodiment of a rocker-crank mechanism with a camming foot platform that shows the mechanism at the bottom of the power stroke.
Figure 8C:
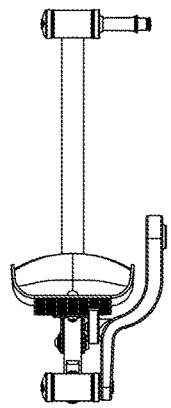
FIG. 8C is a rear projection view of the mechanism depicted in FIG. 8A.
Figure 8D:
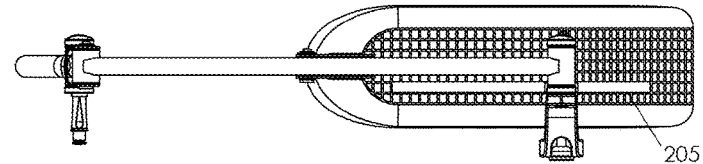
FIG. 8D is a bottom plan view of the mechanism depicted in FIG. 8A.
Figure 8G:
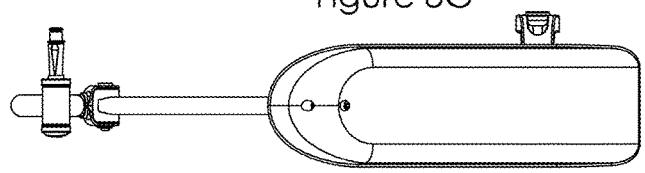
FIG. 8G is a top plan view of the mechanism depicted in FIG. 8F.
Figure 8J:
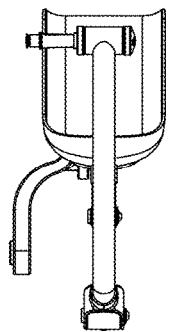
FIG. 8J is a front projection view of the mechanism depicted in FIG. 8F.
Figure 8F:
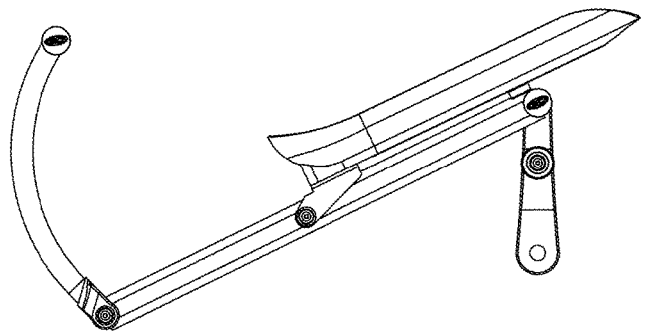
FIG. 8F is a side elevation view of the mechanism depicted in FIG. 8A that shows the mechanism at the top of the power stroke.
Figure 8H:
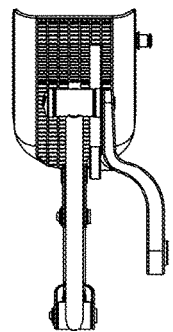
FIG. 8H is a rear projection view of the mechanism depicted in FIG. 8F.
Figure 8I:
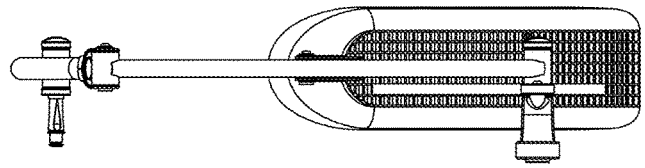
FIG. 8I is a bottom plan view of the mechanism depicted in FIG. 8F.
Figure 9B:
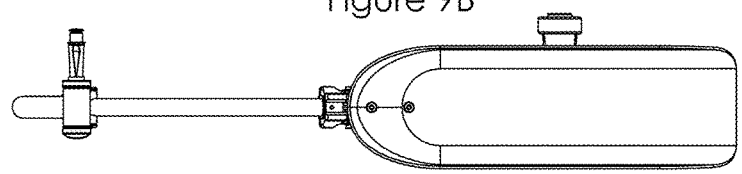
FIG. 9B is a top plan view of the mechanism depicted in FIG. 9A.
Figure 9E:
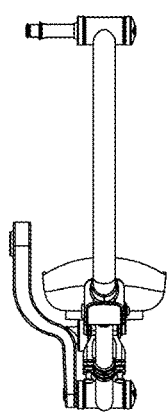
FIG. 9E is a front projection view of the mechanism depicted in FIG. 9A.
Figure 9A:
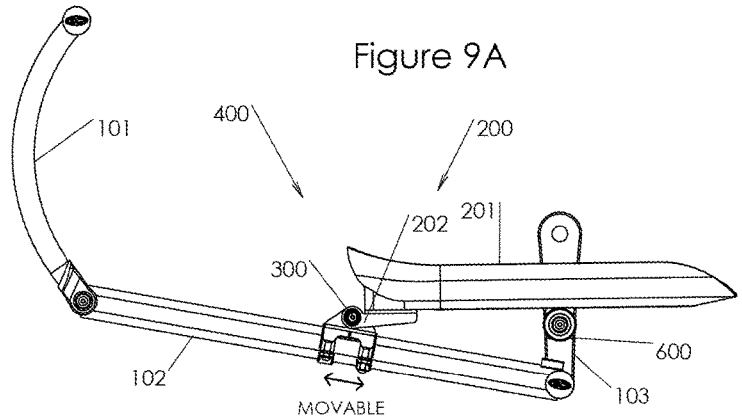
FIG. 9A is a side elevation view of another embodiment of a rocker-crank mechanism with a camming foot platform that shows the mechanism at the bottom of the power stroke.
Figure 9C:
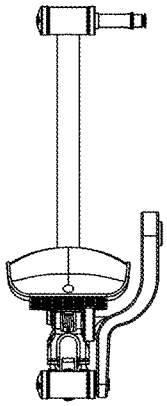
FIG. 9C is a rear projection view of the mechanism depicted in FIG. 9A.
Figure 9D:
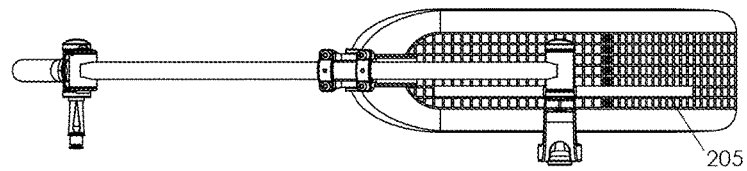
FIG. 9D is a bottom plan view of the mechanism depicted in FIG. 9A.
Figure 9G:
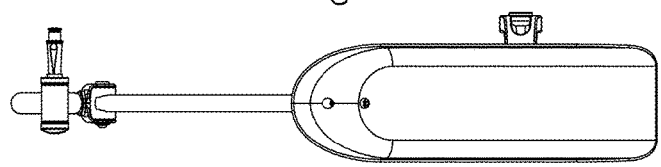
FIG. 9G is a top plan view of the mechanism depicted in FIG. 9F.
Figure 9J:
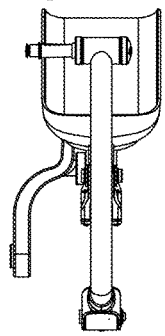
FIG. 9J is a front projection view of the mechanism depicted in FIG. 9F.
Figure 9F:
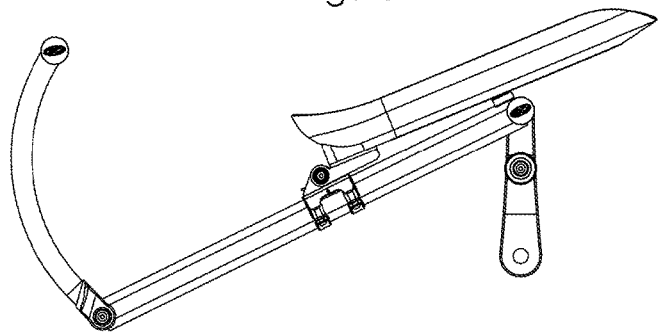
FIG. 9F is a side elevation view of the mechanism depicted in FIG. 9A that shows the mechanism at the top of the power stroke.
Figure 9H:
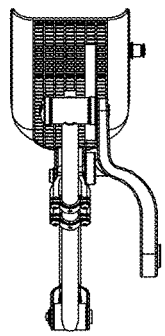
FIG. 9H is a rear projection view of the mechanism depicted in FIG. 9F.
Figure 9I:
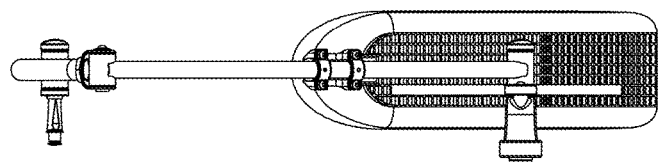
FIG. 9I is a bottom plan view of the mechanism depicted in FIG. 9F.

The front pivot receiving portion 202 and rear cam follower portion 205 of the foot platform assembly 200 could be incorporated integrally into the foot platform 201 itself or they could be implemented as sub-assemblies with separate brackets and hardware as is known in the art. The rear cam follower portion 205 of the foot platform assembly 200 may include a feature or surface on the foot platform 201 directly that makes sliding and/or rolling contact with the protruded feature of the cam assembly 600 or the rear cam follower portion 205 includes an intermediary piece attached to the underside of the foot platform 201 which could be made of any of a multitude of different materials in order to optimize the durability and friction characteristics of this sliding interface. This intermediary piece could also have different linear or curved profiles in order further optimize the foot platform angle FA throughout the pedal stroke. In FIGS. 8F and 8J the foot platform 201 could stop directly on the top of the drive arm or there could be an intermediary interface which could be made of any of a multitude of different materials attached to the foot platform 201 and/or the drive arm 102 in order to optimize the durability and friction characteristics of this interface and/or dampen the impact energy and noise made by these parts contacting one another during the pedal stroke.

In FIGS. 8A-8J the foot platform pivot assembly 300 pivotally attaches the front pivot receiving portion 202 of the foot platform assembly 200 to the drive arm 102. In its simplest form the foot platform pivot assembly 300 includes a fixed hole in the drive arm structure to which the foot platform assembly 200 attaches to via a fastener such as a pin, axle or screw. It could also be implemented via a separate bracket assembly which is mechanically attached to the drive arm structure via welding, bonding or other mechanical fastening methods known in the art. It could also be implemented as a movable bracket assembly in order to be able to adjust the behavior of the foot platform angle FA throughout the pedal stroke. For a given cam assembly 600 and cam follower 205, decreasing the pivot offset PO would make the foot platform angle FA more positive at the bottom of the stroke and less positive at the top of the stroke. The interface between the foot platform pivot assembly 300 and the front pivot receiving portion 202 could be implemented with additional features including, but not limited to, a plain or rolling element bearing in order to minimize friction, or a spring element such as a torsion spring in order to assist in keeping the cam follower portion 205 in contact with the cam assembly 600 or top of the drive arm 102 depending on pedal stroke position. The camming foot platform system depicted in this embodiment could alternatively be implemented on an elliptical cycle with a slider-crank mechanism by removing the swing arm 101 and by moveably coupling drive arm 102 at its forward end to guide tracks coupled to, or integral with, the frame of the elliptical cycle.

FIGS. 9A-9J depict an alternate embodiment of a rocker-crank mechanism with a short drive arm 102 and camming foot platform assembly 200 similar to the one depicted in FIGS. 8A-8J but with a movable foot platform pivot assembly 300. FIGS. 9A-9E show the mechanism at the bottom of the power stroke. FIGS. 9F-9J show the mechanism at the top of the power stroke. The camming foot platform system depicted in this embodiment could alternatively be implemented on an elliptical cycle with a slider-crank mechanism by removing the swing arm 101 and by moveably coupling drive arm 102 at its forward end to guide tracks coupled to, or integral with, the frame of the elliptical cycle.

Figure 10A:
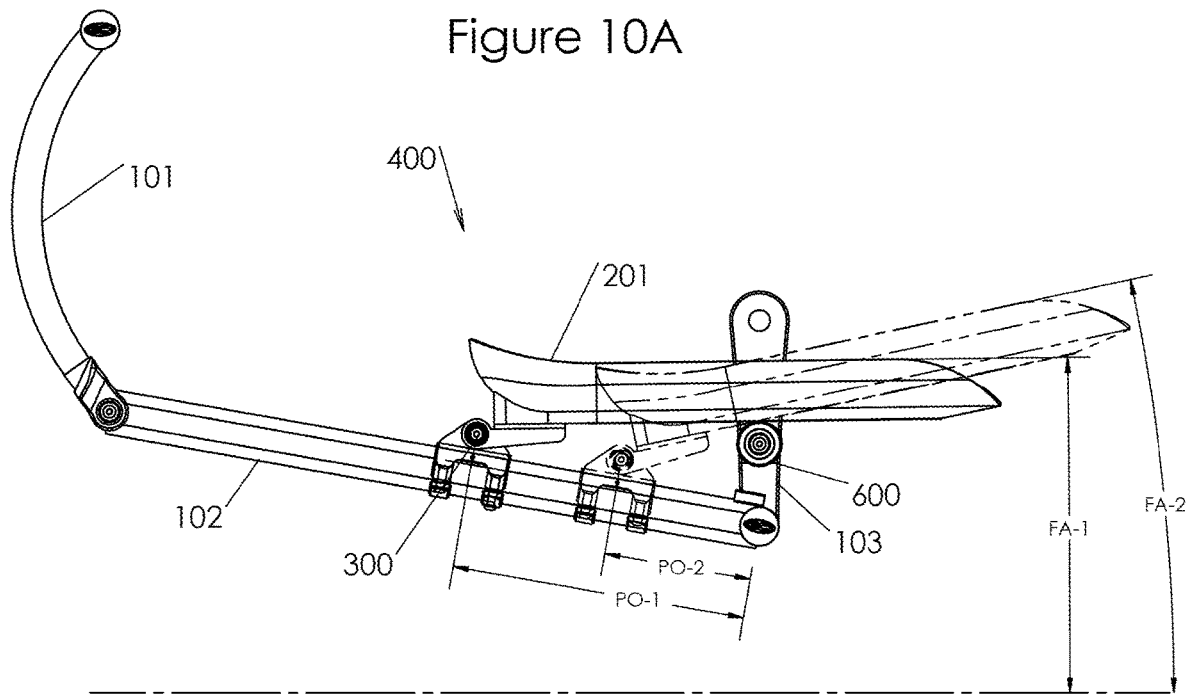
FIG. 10A is a side elevation view of the mechanism depicted in FIGS. 9A-9J that shows the change in foot platform angle at the bottom of the power stroke that results from moving the foot platform pivot offset.
Figure 10B:
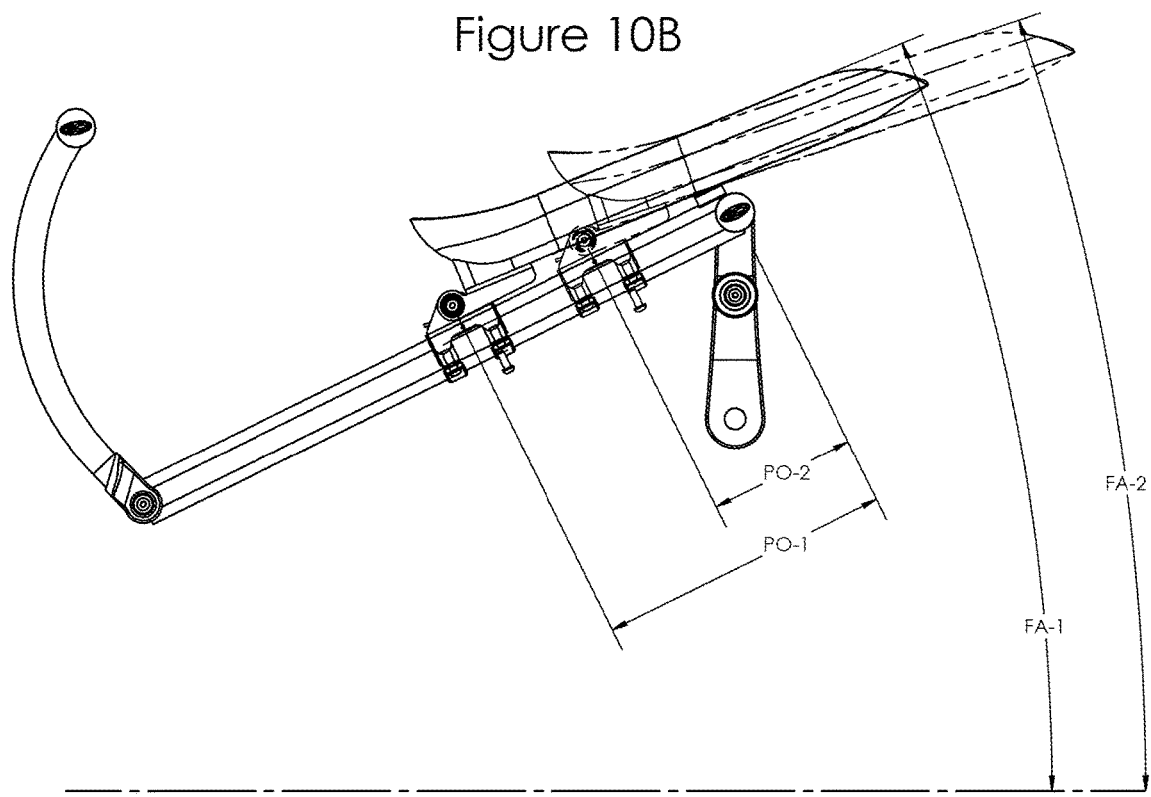
FIG. 10B is a side elevation view of the mechanism depicted in FIGS. 9A-9J that shows the change in foot platform angle at the top of the power stroke that results from moving the foot platform pivot offset.

FIGS. 10A and 10B shows the effect that changing the foot platform pivot offset PO has on the foot platform angle DA for the mechanism depicted in FIGS. 9A-9J. As shown in FIG. 10A decreasing the pivot offset from PO-1 to PO-2 increases the foot platform angle FA at the bottom of the power stroke. As shown in FIG. 10B decreasing the pivot offset from PO-1 to PO-2 decreases the foot platform angle FA at the top of the power stroke.

Figure 11B:
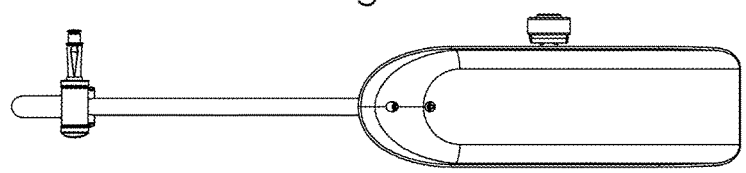
FIG. 11B is a top plan view of the mechanism depicted in FIG. 11A.
Figure 11E:
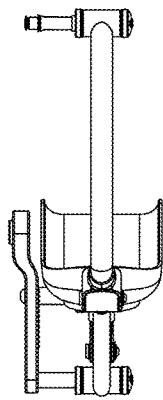
FIG. 11E is a front projection view of the mechanism depicted in FIG. 11A.
Figure 11A:
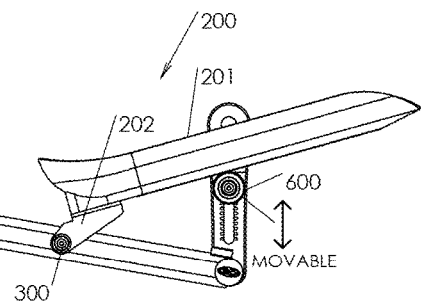
FIG. 11A is a side elevation view of another embodiment of a rocker-crank mechanism with a camming foot platform that shows the mechanism at the bottom of the power stroke.
Figure 11C:
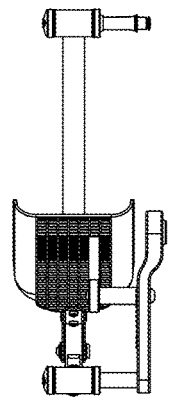
FIG. 11C is a rear projection view of the mechanism depicted in FIG. 11A.
Figure 11D:
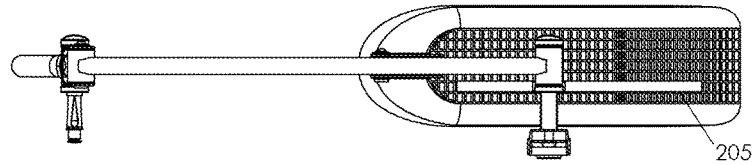
FIG. 11D is a bottom plan view of the mechanism depicted in FIG. 11A.
Figure 11G:
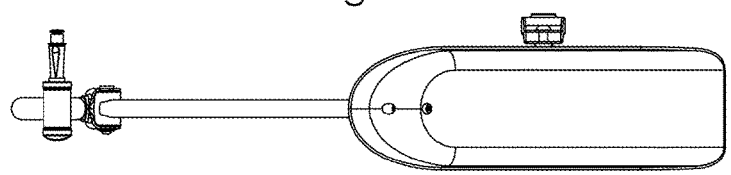
FIG. 11G is a top plan view of the mechanism depicted in FIG. 11F.
Figure 11J:
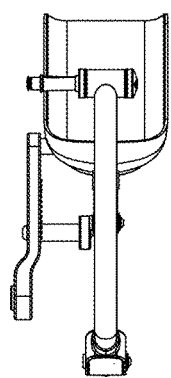
FIG. 11J is a front projection view of the mechanism depicted in FIG. 11F.
Figure 11F:
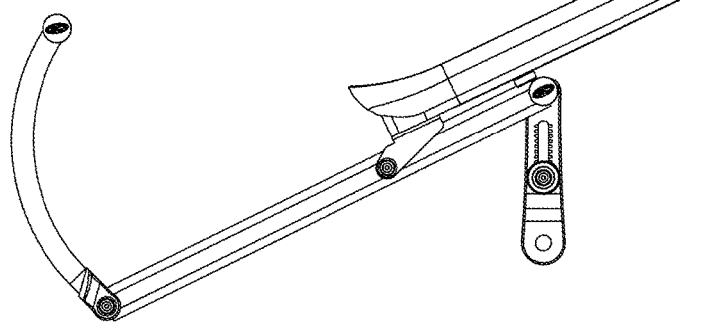
FIG. 11F is a side elevation view of the mechanism depicted in FIG. 11A that shows the mechanism at the top of the power stroke.
Figure 11H:
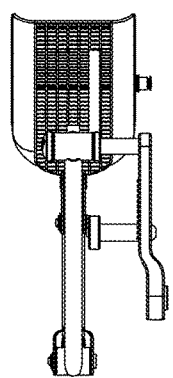
FIG. 11H is a rear projection view of the mechanism depicted in FIG. 11F.
Figure 11I:
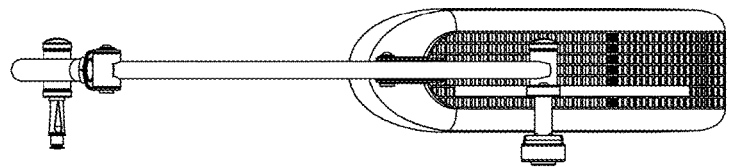
FIG. 11I is a bottom plan view of the mechanism depicted in FIG. 11F.

FIGS. 11A-11K depict an alternate embodiment of a rocker-crank mechanism with a short drive arm 102 and camming foot platform assembly 200 similar to the one depicted in FIGS. 8A-8J but with a movable cam assembly 600. FIGS. 11A-11E show the mechanism at the bottom of the power stroke. FIGS. 11F-11J show the mechanism at the top of the power stroke. FIG. 11K shows the effect that changing the cam offset CD has on the foot platform angle DA. Decreasing the cam offset from CD-1 to CD-2 decreases the foot platform angle FA at the bottom of the power stroke. As seen in FIGS. 11F-11J changing the cam offset CD has no effect on the foot platform angle DA at the top of the power stroke as the cam assembly 600 is disengaged and the foot platform assembly 200 stops on the back of the drive arm. This movable cam functionality could be implemented in many different ways known in the art including, but not limited to, having the cam assembly moveable in a slot as shown, or movable about a series of discrete holes or apertures, or via a bracket with an aperture that encompasses the crank arm 103 and is slideable and able to be clamped or mechanically interlocked into different positions along its length. The camming foot platform system depicted in this embodiment could alternatively be implemented on an elliptical cycle with a slider-crank mechanism by removing the swing arm 101 and by moveably coupling drive arm 102 at its forward end to guide tracks coupled to, or integral with, the frame of the elliptical cycle.

Figure 12K:
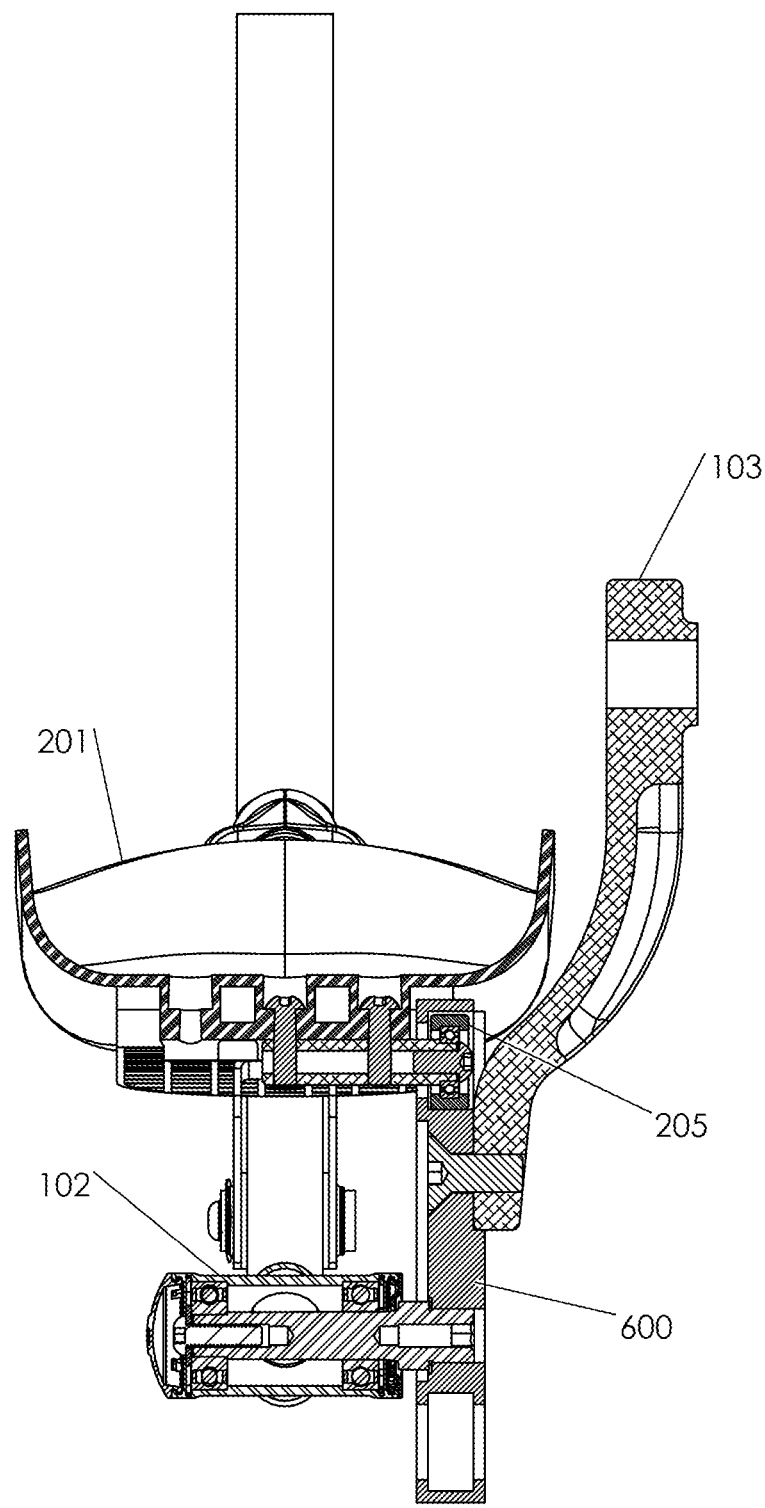
FIG. 12K is a cross-sectional view of the mechanism depicted in FIG. 12A taken along line K-K of FIG. 12A.

FIGS. 12A-12K depict an alternate embodiment of a rocker-crank mechanism with a short drive arm 102 and camming foot platform assembly 200 similar to the one depicted in FIGS. 7A-7J but with a cam assembly 600 which captures the cam follower feature 205 preventing it from disengaging from the cam assembly 600. FIGS. 12A-12E show the mechanism at the bottom of the power stroke. FIGS. 12F-12J show the mechanism at the top of the power stroke. This functionality allows for the front pivot receiving portion 202 of the foot platform assembly 200 to be moved rearward away from the front of the foot platform 201, allowing for a larger range of rider foot offsets FO and resulting foot paths for a given camming foot platform system, including ones which are forward of the foot platform pivot 300. This is particularly important for long stride length systems. This functionality also ensures that the cam follower 205 is always engaged with the cam assembly 600 even if a rider hits a bump or disturbance in the road. It also keeps the foot platform assembly 200 secure when the bike is being transported. FIG. 12K is a rear section view of the mechanism in the bottom of the power stroke. As can be seen in FIG. 12K, the roller of the cam follower assembly 205 is captured by the female channel feature in the cam assembly 600. The camming foot platform system depicted in this embodiment could alternatively be implemented on an elliptical cycle with a slider-crank mechanism by removing the swing arm 101 and by moveably coupling drive arm 102 at its forward end to guide tracks coupled to, or integral with, the frame of the elliptical cycle.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. For example, all of the elliptical cycles and mechanisms disclosed herein have a generally elliptical or ovate foot path where the forward end of the horizontal axis of the ellipse or oval is above the rearward end of the horizontal axis of the ellipse or oval relative to the ground. Other embodiments of an elliptical cycle employing camming foot platforms could be configured so that the foot path has the rearward end of the horizontal axis of the ellipse or oval situated equal with or above the forward end. Such embodiments, and others, are included within the scope of the invention. The camming foot platforms shown and described herein may be applied to elliptically-driven devices such as, but not limited to, elliptical cycles, elliptically-driven watercraft, and stationary elliptical exercise machines.

Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the terms "ovate" and "elliptical" are found throughout the document and are intended to broadly include the family of closed shapes that are not a circle but could be described as "tear-drop", "football", "oval", "pear", "amoeba", "humped", etc. shapes that the foot platforms of a human-powered device could trace through a complete pedal stroke and, consequently, these terms are not intended to be limited to mathematical or other exacting definitions of "elliptical", "ellipse", or "oval"; the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A drive mechanism for an elliptically-driven device, comprising:
   a rocker arm;
   a crank arm;
   a drive arm coupled to the rocker arm and the crank arm at respective pivots, the drive arm including a foot platform pivot assembly;
   a foot platform assembly pivotally coupled to the drive arm via the foot platform pivot assembly;
   a foot platform angle adjustment mechanism operably coupling the foot platform assembly to the crank arm so as to impart a foot platform angle of the foot platform assembly relative to the drive arm that varies during a stroke of the foot platform assembly.

2. The drive mechanism of claim 1, wherein the elliptically-driven device is an elliptical cycle.

3. The drive mechanism of claim 1, wherein the elliptically-driven device is a stationary elliptical exercise machine.

4. The drive mechanism of claim 1, wherein the elliptically-driven device is an elliptically-driven watercraft.

5. The drive mechanism of claim 1, wherein the foot platform angle adjustment mechanism is a cam assembly.

6. The drive mechanism of claim 5, wherein the cam assembly is movable along the crank arm.

7. The drive mechanism of claim 5, wherein the foot platform assembly includes a front pivot receiving portion which is pivotally connected to the foot platform pivot assembly and a rear cam follower portion which is in at least one of sliding and rolling contact with the cam assembly.

8. The drive mechanism of claim 7, wherein the cam assembly includes a closed ovate curve feature attached to the crank arm to which the rear cam follower portion makes at least one of sliding and rolling contact with throughout the stroke of the foot platform assembly.

9. The drive mechanism of claim 7, wherein the cam assembly includes a protruding feature attached to the crank arm located a distance from a pivotal connection of the crank arm and the drive arm whereby the cam assembly engages the rear cam follower portion through only a portion of the stroke of the foot platform assembly.

10. The drive mechanism of claim 7, wherein the cam assembly includes a protruding feature attached to the crank arm located a distance from a pivotal connection of the crank arm and the drive arm whereby the cam assembly engages the rear cam follower portion through only a portion of the stroke of the foot platform assembly, and the foot platform pivot assembly is movable relative to the drive arm.

11. The drive mechanism of claim 7, wherein the cam assembly includes a protruding feature movably attached to the crank arm to adjust a distance of the protruding feature from a pivotal connection of the crank arm and the drive arm whereby the cam assembly engages the rear cam follower portion through only a portion of the stroke of the foot platform assembly.

12. The drive mechanism of claim 7, wherein the rear cam follower portion includes at least one of a feature and surface directly on the foot platform assembly that makes sliding contact with the cam assembly.

13. The drive mechanism of claim 7, wherein the rear cam follower portion includes an intermediary piece having a sliding interface, the intermediary piece attached to an underside of the foot platform.

14. The drive mechanism of claim 7, wherein the rear cam follower portion includes an intermediary piece having a sliding interface, the intermediary piece attached to an underside of the foot platform and having a varying profile in order further optimize the foot platform angle during the stroke of the foot platform assembly.

15. The drive mechanism of claim 7, wherein the rear cam follower portion includes one or more of a simple roller and a bearing in rolling contact with the cam assembly.

16. The drive mechanism of claim 7, wherein the cam assembly includes a feature attached to the crank arm to which the rear cam follower portion makes at least one of sliding and rolling contact with throughout the stroke of the foot platform assembly, and the feature is one of an integral part of the crank arm or a separate piece from the crank arm.

17. The drive mechanism of claim 7, wherein the cam assembly includes a closed ovate curve feature movably attached to the crank arm to which the rear cam follower portion makes at least one of sliding and rolling contact with throughout the stroke of the foot platform assembly.

18. The drive mechanism of claim 5, wherein the cam assembly captures the cam follower portion, preventing the cam follower portion from disengaging from the cam assembly.

19. The drive mechanism of claim 5, wherein the front pivot receiving portion includes one or more of a spring element to bias the cam follower portion in contact with the cam assembly, a plain bearing, and a rolling element bearing.

20. The drive mechanism of claim 5, wherein the cam assembly includes a closed ovate curve feature attached to the crank arm to which the rear cam follower portion makes at least one of sliding and rolling contact with throughout the stroke of the foot platform assembly, and the foot platform pivot assembly is movable relative to the drive arm.

21. The drive mechanism of claim 1, wherein the foot platform pivot assembly is movable relative to the drive arm.

22. The drive mechanism of claim 1, wherein the front pivot receiving portion and a rear cam follower portion of the foot platform assembly are incorporated integrally into the foot platform.

23. The drive mechanism of claim 1, wherein the front pivot receiving portion and a rear cam follower portion of the foot platform assembly are sub-assemblies.

24. A drive mechanism for an elliptically-driven vehicle, comprising:
 a crank arm;
 one of:
 a) a rocker-crank mechanism including a rocker arm and a drive arm coupled to the rocker arm and the crank arm at respective pivots, and
 b) a slider-crank mechanism including a guide track and a drive arm movably coupled to the guide track and coupled to the crank arm at a pivot;
 the drive arm including a foot platform pivot assembly;
 a foot platform assembly pivotally coupled to the drive arm via the foot platform pivot assembly;
 a foot platform angle adjustment mechanism operably coupling the foot platform assembly to the crank arm so as to impart a foot platform angle of the foot platform assembly relative to the drive arm that varies during a stroke of the foot platform assembly.

* * * * *